(12) United States Patent
Gay et al.

(10) Patent No.: US 11,138,086 B2
(45) Date of Patent: Oct. 5, 2021

(54) COLLECTING HARDWARE PERFORMANCE DATA

(71) Applicant: Hewlett-Packard Development Company, L.P., Houston, TX (US)

(72) Inventors: Raphael Gay, Fort Collins, CO (US); Peter Christian Peterson, Fort Collins, CO (US); Finagnon Thierry Dossou, Jr., Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 551 days.

(21) Appl. No.: 15/543,187

(22) PCT Filed: Jan. 28, 2015

(86) PCT No.: PCT/US2015/013374
§ 371 (c)(1),
(2) Date: Jul. 12, 2017

(87) PCT Pub. No.: WO2016/122503
PCT Pub. Date: Aug. 4, 2016

(65) Prior Publication Data
US 2018/0314615 A1  Nov. 1, 2018

(51) Int. Cl.
*G06F 11/00* (2006.01)
*G06F 11/34* (2006.01)
*G06F 11/30* (2006.01)

(52) U.S. Cl.
CPC ...... *G06F 11/3409* (2013.01); *G06F 11/3093* (2013.01); *G06F 11/348* (2013.01); *G06F 2201/86* (2013.01); *G06F 2201/88* (2013.01)

(58) Field of Classification Search
CPC .......... G06F 11/3409; G06F 11/3093; G06F 11/348; G06F 2201/86; G06F 2201/88
See application file for complete search history.

(56) References Cited

U.S. PATENT DOCUMENTS

| | | | |
|---|---|---|---|
| 4,783,736 A | * | 11/1988 | Ziegler ............... G06F 8/45 711/130 |
| 5,768,500 A | | 6/1998 | Agrawal et al. |
| 7,707,578 B1 | | 4/2010 | Zedlewski et al. |
| 7,958,342 B1 | | 6/2011 | Lane et al. |
| 8,136,124 B2 | | 3/2012 | Kosche et al. |
| 2006/0277395 A1 | | 12/2006 | Fowles |

(Continued)

FOREIGN PATENT DOCUMENTS

WO   WO2006101921 A2   9/2006

OTHER PUBLICATIONS

PCT Search Report/Written Opinion; Application No. PCT/US2015/013374 dated Oct. 28, 2015;13 pages.

(Continued)

*Primary Examiner* — Alexander Satanovsky
*Assistant Examiner* — Lynda Dinh
(74) *Attorney, Agent, or Firm* — Fabian VanCott

(57) ABSTRACT

A computing system for collecting hardware performance data includes a number of programmable counters associated with a number of units of a computing device. The computing system further includes an assignment module executed by a processor to assign a plurality of interleaving groups of counters based on a user-defined priority list of parameters.

19 Claims, 11 Drawing Sheets

(56) References Cited

U.S. PATENT DOCUMENTS

| | | |
|---|---|---|
| 2008/0177756 A1 | 7/2008 | Kosche et al. |
| 2011/0173588 A1 | 7/2011 | Salapura et al. |
| 2012/0017165 A1 | 1/2012 | Gardner et al. |
| 2014/0047272 A1 | 2/2014 | Breternitz et al. |

OTHER PUBLICATIONS

Prashobh Balasundaram; "Hardware Performance Monitor for Bluegene/Q"; Mar. 12, 2012; pp. 1-10; International Business Machines.

* cited by examiner

COLLECTING HARDWARE PERFORMANCE DATA

SUMMARY OF PRIOR APPLICATIONS

The current application is a national stage entry under 35 U.S.C. 371, claiming priority to PCT/US2015/013374 filed Jan. 28, 2015.

BACKGROUND

In computing devices and platforms, hardware performance counters are a set of special-purpose registers built into processors such as microprocessors to store a number of counts of hardware-related activities that occur within the computing devices and platforms. These hardware-related activities may be referred to as events. Administrators and other users may rely on those counters to conduct performance analysis or tuning of their computing devices and platforms. The counters assist these individuals by providing useful information regarding events occurring within and performance of a processor, a microprocessor, cores, memory controllers, a chipset, caches, and other computing components within the computing devices and platforms during execution of applications and workloads on the computing devices and platforms.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1A:
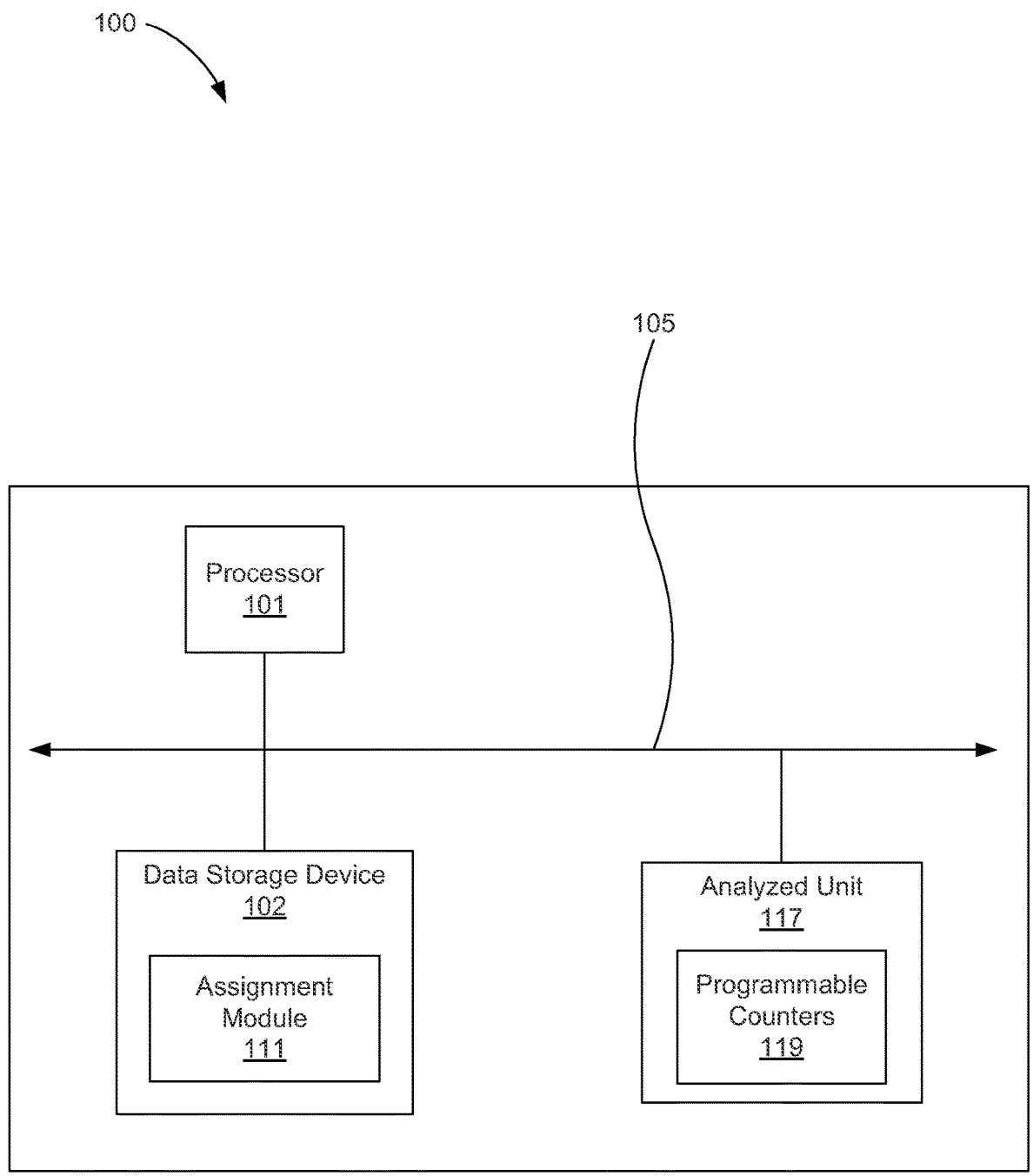
FIG. 1A is a block diagram of a computing system for collecting hardware performance data, according to one example of the principles described herein.

As described above, computing devices and platforms include hardware performance counters to provide information to a user regarding events occurring within the computing devices and platforms. Software may be used to help analyze the data provided by the hardware performance counters.

Hardware performance counters provide insight into the behavior of the various aspects of a processor and may be used by an administrator or other individual to identify limited throughput or data transfer rates (e.g., bottlenecks) within or between a number of units operating within a computing system. An individual such as a software developer may then use the information obtained from the hardware performance counters to understand how an application executes on the units, where potential data transfer problems may exist, and how to improve the application. Hardware performance counters have a myriad of applications in understanding the performance of a computing system and its various units.

Hardware performance counters may include logic added to the central processing unit (CPU) to track operations or events within the CPU. For example, some events identified and sampled by the counters include events associated with cache misses, cache loads, cache stalls, alerts, events that indicate the number of instructions completed, and events that indicate the number of floating point instructions executed, among many other types of events. Depending on the computing platform and its associated processing devices, there may be hundreds or thousands of events that are countable that may provide information about the units. However, computing topologies and processor architectures may only allow a small subset of these events to be counted simultaneously due to a small number of performance counters available within the processing devices.

Further, processors that contain hardware performance counters implement a limited number of counters that may be assigned to one specific event. For example, each of Intel Corporations processors that contain hardware performance counters implements only four counters per internal unit. In this example, every unit within the core and within the uncore include a number of performance counters These four counters may each be assigned to one specific event. However, there may be up to a dozen events of interest to an administrator or other user when conducting performance analysis. Thus, the ability to obtain enough data associated with computing performance in a timely manner is difficult.

Further, many software packages used to collect, analyze, and present performance data to a user only allow the user to selected a limited number of events to be analyzed based on the limited number of counters available. Such performance analytic software packages include PERFORMANCE COUNTER MONITOR (PCM) software developed and distributed by Intel Corporation, VTUNE performance analytic software developed and distributed by Intel Corporation, and WINDOWS PERFORMANCE MONITOR software developed and distributed by Microsoft Corporation, among other performance analytic software. These performance analytic software packages limit the number of events sample-able to less than a handful per computing device, when a dozen or more may be necessary for detailed performance investigations.

In order to collect and analyze a user-desired amount of events utilizing the above performance analytic software, a user is forced to do as many runs of an application or workloads as they need to capture different groups of events. This approach to computing event analytics is impractical due to un-reconcilable run-to-run variations preventing correlation of the collected samples. This approach is further impractical due to the sheer amount of time needed to perform the analysis. Examples described herein provide a method of collecting hardware performance data. The method includes, with a processor, executing an assignment module to assign a plurality of interleaving groups of programmable counters from a number of programmable counters within a computing device. The interleaving groups of programmable counters define which of the events the programmable counters within each of the groups of programmable counters are to sample in a corresponding number of sampling periods, a sequence at which each programmable counter in the interleaving groups of programmable counters are to be executed, and a sequence at which the interleaving groups of programmable counters are to be executed.

The method further includes, with the processor, executing an event sampling module to instruct the assigned interleaving groups of programmable counters to sample events occurring in a number of units within the computing device based on the assignment. The method also includes executing a reassignment module to, between samplings of interleaving groups of programmable counters, reconfigure a number of the programmable counters to execute a subsequent sampling of the events based on a subsequent assignment defined by a subsequent interleaving group of programmable counters.

The method may further include executing an interpolation module to interpolate between a number of captured values of a first event if the first event was not able to be interleaved with the plurality of interleaving groups. The interpolation may be performed in a real-time manner between the execution of each of the assigned interleaving groups of programmable counters. Further, the interpolation may be performed after completion of the sampling periods corresponding to a cyclic interleaving group sequence. Still further, the interpolation may be performed after completion of all cyclic interleaving group sequences or a number of cyclic interleaving group sequences of the user's workload or application. In this example, interpolation may occur after sampling of large numbers of cyclic interleaving group sequences.

Assigning a plurality of interleaving groups of programmable counters includes receiving data defining a number of events associated with a number of analyzable units from a user, and assigning the plurality of interleaving groups of programmable counters to a number of events based on the received data. A number of fixed counters (118) are assigned to execute with the plurality of interleaving groups of counters.

In one example, assigning a plurality of interleaving groups of programmable counters is based on a priority list of parameters. Further, in one example, the parameters are user-definable.

As used in the present specification and in the appended claims, the term "unit" is meant to be understood broadly as any hardware device that operates within a computing system. The units may include processing devices, subcomponents within a processing device, a central processing unit's (CPU's) functional units, caches, power controllers, power supply devices, and memory devices, among many other hardware devices within the computing system.

Further, as used in the present specification and in the appended claims, the term "event" or similar language is meant to be understood broadly as any action taken by a hardware device within a computing system. The hardware devices whose actions may be analyzed include the "units" defined above. The number of events that may occur in connection with the processing device may be in the hundreds or thousands. The events may be associated with any device that takes action during at least one process within a computing device. Examples, of types of events that may occur in connection with the processing device include events associated with cache operations including cache misses, cache loads, and cache stalls, among other cache-related events. Other types of events include alerts, events that indicate the number of instructions completed, and events that indicate the number of floating point instructions executed, among many other types of events.

Still further, as used in the present specification and in the appended claims, the term "counter" is meant to be understood broadly as any hardware device that samples instances of an event occurring within or an action taken by a unit. In one example, a unit may include a number of programmable or assignable counters. Programmable or assignable counters are counters that may be programmed or assigned to sample instances of an event. In one example, a user may provide instruction as to what event a counter is to be assigned. In one example, a number of programmable counters are provided for each of a number of units within a computing device that is to be analyzed.

In another example, a unit may include a number of fixed counters. Fixed counters are counters that cannot be programmed or assigned or reprogrammed or reassigned, but are preprogrammed to sample instances of an event without variation. In one example, a manufacturer of the unit the fixed counter is included within provides the assignment of a fixed counter. Some examples of fixed counters include clock counters used to accumulate clock values relevant to a unit, or state counters that accumulate a state occupancy of a unit, among other types of fixed counters.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1A is a block diagram of a computing system (100) for collecting hardware performance data, according to one example of the principles described herein. The computing system (100) may comprise a number of processors (101), a number of data storage devices (102), and at least one unit (117) to be analyzed. The number of processors (101), data storage devices (102), and at least one unit (117) may be interconnected through the use of a number of busses and/or network connections. In one example, the processors (101), data storage devices (102), and at least one unit (117) may be communicatively coupled via a bus (105).

The data storage device (102) may store an assignment module (111) to, when executed by the processor (101), assign a plurality of interleaving groups of programmable counters from a number of programmable counters (119) within a computing device whose at least one unit (117) is to be analyzed. The at least one unit (117) to be analyzed includes a number of programmable counters (119) assigned by the assignment module (111) into the interleaving groups. The interleaving groups of programmable counters (119) are used to sample events within the unit (117) to be analyzed. More details regarding the collection of hardware performance data will now be described in connection with FIG. 1B.

Figure 1B:
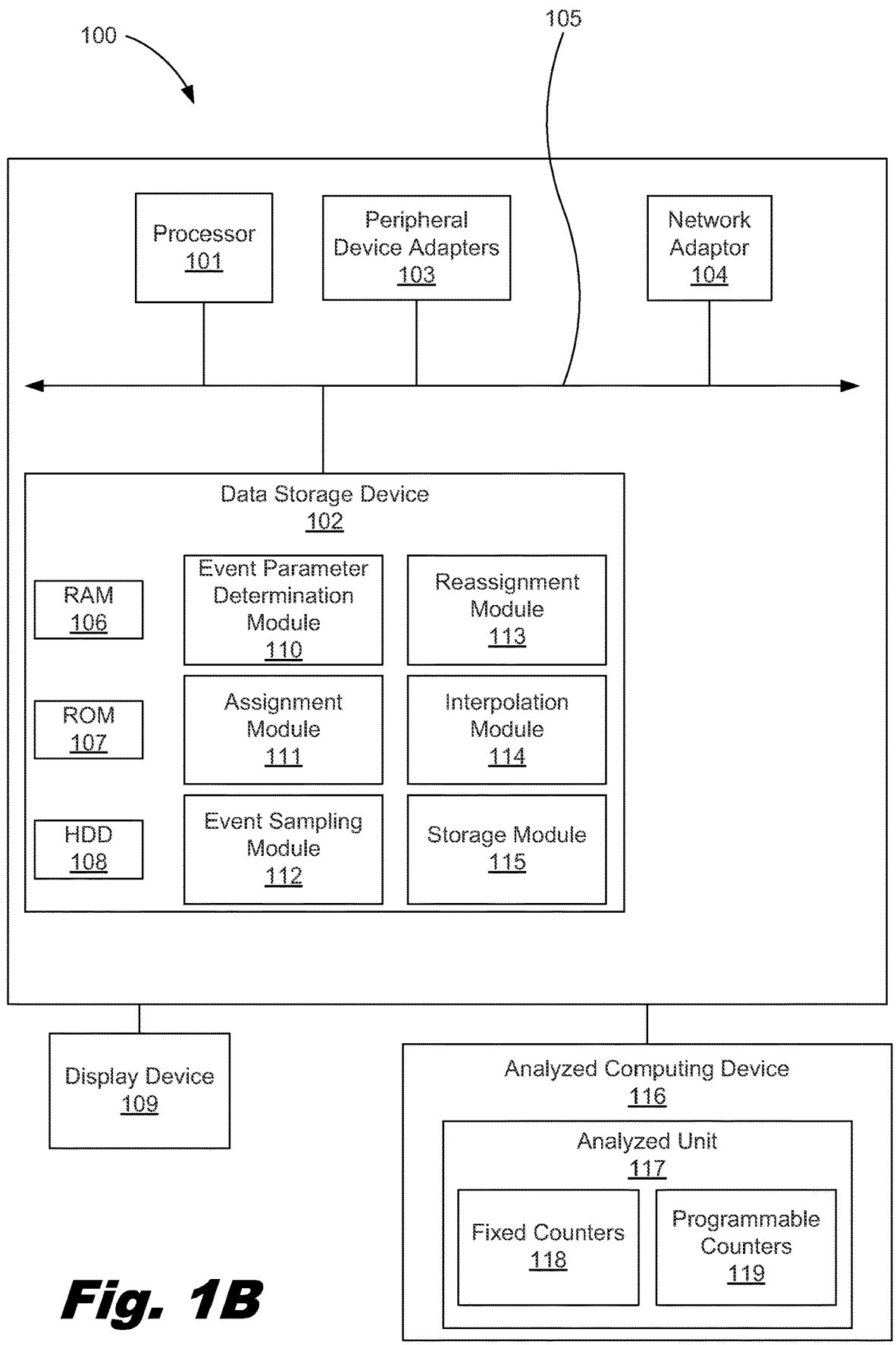
FIG. 1B is a block diagram of a computing system for collecting hardware performance data, according to another example of the principles described herein.

FIG. 1B is a block diagram of a computing system (100) for collecting hardware performance data, according to one example of the principles described herein. The computing system (100) may be implemented in an electronic device. Examples of electronic devices include servers, desktop computers, laptop computers, personal digital assistants (PDAs), mobile devices, smartphones, gaming systems, and tablets, among other electronic devices.

The computing system (100) may be utilized in any data processing scenario including, stand-alone hardware, mobile applications, through a computing network, or combinations thereof. Further, the computing system (100) may be used in a computing network, a public cloud network, a private cloud network, a hybrid cloud network, other forms of networks, or combinations thereof. In one example, the methods provided by the computing system (100) are provided as a service over a network by, for example, a third party. In this example, the service may comprise, for example, the following: a Software as a Service (SaaS) hosting a number of applications; a Platform as a Service (Paas) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing system (100) are executed by a local administrator.

To achieve its desired functionality, the computing system (100) comprises various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processors (101), data storage devices (102), peripheral device adapters (103), and network adapters (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of executing an assignment module to assign a plurality of interleaving groups of programmable counters from a number of programmable counters (119) within a computing device. The processor (101) further implements the functionality of executing an event sampling module to instruct the assigned interleaving groups of programmable counters to sample events occurring in a number of units within the computing device based on the assignment. The processor (101) further implements the functionality of executing a reassignment module to, between samplings performed for the interleaving groups of programmable counters, reconfigure a number of the programmable counters (119) to execute a subsequent sampling of the events based on a subsequent assignment defined by a subsequent interleaving group of programmable counters.

The processor (101) further implements the functionality of executing an interpolation module to interpolate between a number of captured values of a first event if the first event was not able to be interleaved with the plurality of interleaving groups. In one example, interpolation is performed in a real-time manner between the execution of each of the assigned interleaving groups of programmable counters. In another example, interpolation is performed after all of the assigned interleaving groups of counters have been sampled any number of times. Thus, the processor (101) implements at least these functionalities according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the computing system (100) enable the processor (101) to interface with various other hardware elements, external and internal to the computing system (100). For example, the peripheral device adapters (103) may provide an interface to input/output devices, such as, for example, display device (109), a mouse, or a keyboard. The peripheral device adapters (103) may also provide access to other external devices such as an external storage device, a number of network devices such as, for example, servers, switches, and routers, client devices, other types of computing devices, and combinations thereof. The network adapter (104) may provide an interface to other computing devices within, for example, a network, thereby enabling the transmission of data between the computing system (100) and other devices located within the network.

The display device (109) may be provided to allow a user of the computing system (100) to interact with and implement the functionality of the computing system (100). The peripheral device adapters (103) may also create an interface between the processor (101) and the display device (109), a printer, or other media output devices.

The computing system (100) may, when executed by the processor (101), display the number of graphical user interfaces (GUIs) on the display device (109) associated with the executable program code representing the number of applications stored on the data storage device (102). The GUIs may display, for example, options for user-selection of a number of counter sampling requests, assignment of interleaving groups of programmable counters selection of interpolation techniques, and graphs depicting live or stored results of the processes described herein, or other displayable information as described herein. Further, the user may be presented with a number of options on the GUI regarding possible events that may be sampled via the fixed counters (118) and programmable counters (119). In this example, the user may select a number of options indicating a number of the events the user desires to be sampled. The user may also indicate a desired priority at which the user wishes the events to be sampled. Further, the user may also indicate a frequency at which the user desires a number of the events to be sampled. Still further, the user may also indicate a that a number of events must be sampled in the same sampling period. In this example, the assigning of interleaving of events for the sampling periods as described below may be automatically determined via a number of user-definable or set parameters and based on one or more of the user's inputs regarding (1) the events the user desires to be sampled; (2) the priority at which the user wishes the events to be sampled; (3) the frequency at which the user desires a number of the events to be sampled; (4) a that a number of events must be sampled in the same sampling period, and other user-defined parameters, and combinations thereof.

In another example, the parameters associated with the GUI may be manually configurable via a configuration file such as a number of PCCFG files. In this example, a system administrator may create or modify the configuration file by hand using a text editor. In another example, the computing system (100) may create portions of the configuration file. The configuration file would then be read and executed according to the parameters defined by the user. In one example, the configuration file further includes data defining each of a number of the units' configuration register layouts and the user requirements. In one example, the units' configuration register layout data may include data regarding the global configuration space registers (CSRs) and model-specific registers (MSRs) of the units (117, 201 through 210), data regarding a reference dock (dock signal used to synchronize and schedule operations), and data regarding the registers for the fixed counters (118) and the programmable counters (119) within the units. This data may be obtained from a manufacturer of each of the units.

The units' configuration register layout data may further include a user-specified list of events to sample and rules by which those events are to be sampled. Still further, the unit's configuration register layout data may include entangling and minimum sampling rules associated with the events to be sampled within the number of units. Entangling and minimum sampling rules will be described in more detail below.

Turning again to the computing system (100) of FIG. 1B, by making a number of interactive gestures on the GUIs of the display device (109), a user may make selections based on these displayed options. Examples of display devices (109) include a computer screen, a laptop screen, a mobile device screen, a personal digital assistant (PDA) screen, and a tablet screen, among other display devices (106). Examples of the GUIs displayed on the display device (109), will be described in more detail below.

The computing system (100) further comprises a number of modules used in the implementation of the systems and methods described herein. The various modules within the computing system (100) comprise executable program code that may be executed separately. In this example, the various modules may be stored as separate computer program products. In another example, the various modules within the computing system (100) may be combined within a number of computer program products; each computer program product comprising a number of the modules.

The computing system (100) may include an event parameter determination module (110) to, when executed by the processor (101), determine a number of event entanglement parameters and a number of minimum sampling rate parameters for use in determining how events are to be sampled in a number of sampling periods. The event parameter determination module (110) may obtain parameters associated with the entanglement parameters and minimum sampling rate parameters from a user, automatically assign these parameters based on the events selected by associated with the entanglement parameters and minimum sampling rate parameters, or combinations thereof.

The computing system (100) may include an assignment module (111) to, when executed by the processor (101), assign a plurality of interleaving groups of programmable counters from a number of programmable counters (119) within a computing device. In one example, the assignment module (110) receives data defining a number of events associated with a number of analyzable units from a user, and assigns the plurality of interleaving groups of programmable counters to a number of events based on the received data. Assigning the plurality of interleaving groups of programmable counters is based on a priority list of parameters. The parameters may be user-definable. The parameters may include not assigning events to a programmable counter (119) that are assigned to a fixed counter (118), assigning entangled events, entangled events comprising events that must be sampled within a same sampling period, assigning single events based on a number of minimum sampling requirements, single events comprising events that are not required to be sampled within the same time period, assigning single events that do not require minimum sampling, or combinations thereof. In one example, a number of programmable counters (119) are assigned to sample a number of events, with a number of fixed counters (118) being assigned to sample a number of different events simultaneously. In one example, the assignment module (110) does not assign events to a programmable counter (119) that are assigned to a fixed counter (118).

The computing system (100) may further include an event sampling module (112) to, when executed by the processor (101), instruct the assigned interleaving groups of programmable counters to sample events occurring in a number of units within the computing device based on the assignment of the plurality of interleaving groups of programmable counters. The events are sampled in a number of sampling periods.

The computing system (100) may further include a reassignment module (113) to, when executed by the processor (101), reconfigure a number of the counters by reassigning the counters to sample additional or different events. Reconfiguring and reassigning the counters may occur between a number of sampling periods. In one example, the assignment module (111) and the reassignment module (113) are combined into one module that handles assignment of programmable counters to a number of events to create a first interleaving group, and reassigning those programmable counters to a different number of events to create a subsequent interleaving group. The assignment and reassignment modules (111, 113) also create a number of interleaving groups consistent with the list of events, and the entangling and minimum sampling requirements that meet a user's event sampling requirements.

The computing system (100) may further include an interpolation module (114) to, when executed by the processor (101), to interpolate between a number of captured values of a first event if the first event was not able to be interleaved with the plurality of interleaving groups. In one example, interpolation is performed in a real-time manner between the execution of each of the assigned interleaving groups of programmable counters and between sampling periods.

The computing system (100) may further include a storage module (115) to, when executed by the processor (101), store a number of sampled events. In one example, storage of the sampled events may occur between each execution of the assigned interleaving groups of programmable counters and between sampling periods. In another example, storage of the sampled events may occur in a real-time manner in which the sampled events are stored as they are sampled. The sampled events may be recorded in results files stored in a data storage device such as, for example, a dedicated cache, another cache, RAM (106), HDD memory (108), another date storage device.

The computing system (100) analyzes a unit (117) within a computing device (116) to be analyzed. The analyzed unit (117) includes a number of fixed counters (118) and a number of programmable counters (119) that are utilized in the examples described herein. In one example, the analyzed unit (117) is the computing system (100) itself. In this example, the analyzed unit (117) and the analyzed computing device (116) are included within the computing system (100), or are locally networked with the computing system (100).

In another example, the analyzed unit (117) is a unit coupled to the computing system (100) via a computer network. In this example, the computing system (100) serves to analyze the unit (117) as it executes a number of actions within a computing device coupled to the computing system (100) via the network. As described above, the computing system (100) in this role serves as a SaaS computing system, a PaaS computing system, a APIaaS computing system, or any other computing system that provides services as a service over a network.

Figure 2:
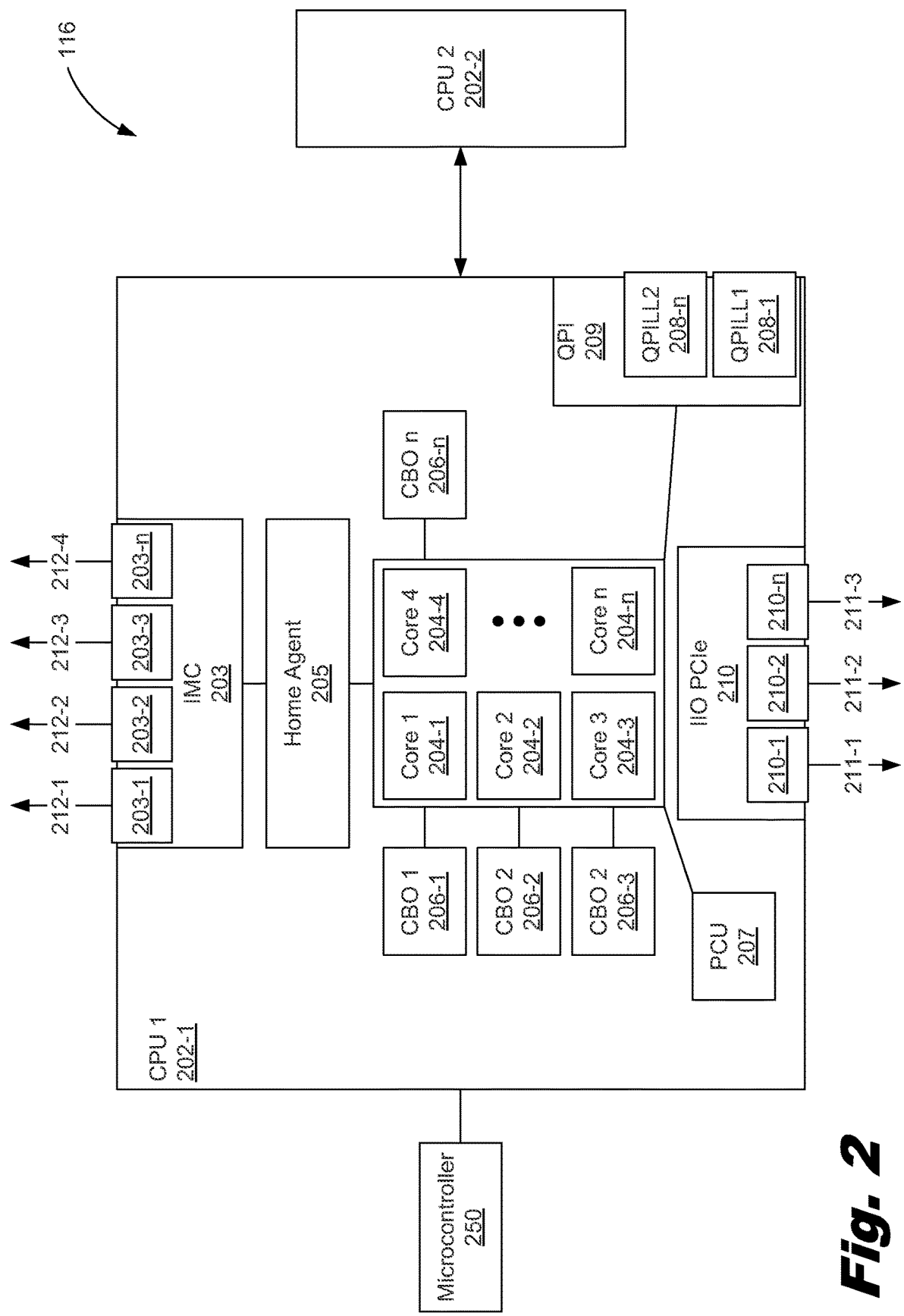
FIG. 2 is a block diagram of a number of units analyzed by the computing system of FIG. 1B, according to one example of the principles described herein.

FIG. 2 is a block diagram of a number of units (117) analyzed by the computing system (100) of FIG. 1B, according to one example of the principles described herein. Any number of units (117) may be included within a computing device (116) to be analyzed. As mentioned above, a large number of units include a number of fixed counters (118) and programmable counters (119) used to sample events within or an action taken by a unit. As depicted in FIG. 2, these units may include, for example, a number of CPUs (202-1, 202-2). Each CPU (202) may contain other units including, for example, an integrated memory controller (IMC) (203) including a number of memory channel controllers (CHs) (203-1, 203-2, 203-3, 203-n), a number of cores (204-1, 204-2, 204-3, 204-4, 204-n), and a number of home agents (HAs) (205). The CHs (203-1, 203-2, 203-3, 203-n) provide an interface or channels (212-1, 212-2, 212-3, 212-4) between memory devices such as dynamic random-access memory (DRAM) and the IMC and HAs (205), and provide reliability, availability, and service-ability (SAR) and error-correcting code (ECG) support. The HA (205) provides an interface between the cores (204) and the IMC (203). The HA (205) also serves as a conflict manager, and provides memory access ordering and cache coherencies support.

The units including fixed counters (118) and programmable counters (119) may further include, for example, a number of Cbo nodes (206-1, 206-2, 206-3, 206-n), and a number of power control units (PCUs) (207). The Cbos (206) are last level cache (LLC) coherence engines that manage LLCs associated with the core and data delivery from the LLC to a requesting core. The Cbos (206) also generate snoops and collect snoop responses from the cores. The PCUs (207) are firmware driven microcontrollers that govern processing of performance states (P-states), govern core power modes (C-states), control speeds of the cores (204) (e.g., Turbo Mode), and manages processor temperatures.

The units including fixed counters (118) and programmable counters (119) may still further include, for example, a number of QPI Link Layer interfaces (209) such as an R3QPI interface between the ring and the QPI Link Layer that is responsible for translating between ring protocol packets and flits that are used for transmitting data across the interface, and a number of QPILL (QPI link layer) nodes (208-1, 208-n) responsible for packetizing requests from a caching agent such as the Chos (206) on the way out to the system interface. The QPILL nodes (208) also convert and forward Cbo (206) and ring requests to OH requests. When a reference number includes the designation "n," this indicates that any number of that element may be present. Still further, a number of integrated input/output lanes (210-1, 210-2, 210-n) such as a peripheral component interconnect express (PCIe) bus may be provided and may be included as a unit that includes fixed counters (118) and programmable counters (119). In one example, the integrated PCIe bus (210) may be a generation three PCIe bus that provides forty lanes. Each of the number of integrated input/output lanes (210-1, 210-2, 210-n) may include a PCIe port (211-1, 211-2, 211-3).

The units depicted in FIG. 2 are not exhaustive of the types or numbers of units that may be present in a computing device (116) to be analyzed. Further, there may be hundreds or thousands of events that are countable that may provide information about the units, and a number of programmable counters (119) that may be assigned to sample any of these events. In one example, each unit may have tens of events that are sampleable. In one example, each unit (117, 201 through 210) to be analyzed includes four programmable counters (119). Further, each unit (117, 201 through 210) to be analyzed may include a number of fixed counters (118). In one example, each unit (117, 201 through 210) to be analyzed includes two fixed counters (118). With the amount of events that may be counted being higher than the number of fixed counters (118) and programmable counters (119) available, the examples described herein provide a system and method of sampling all events a user desires to sample.

A microcontroller (250) may be coupled to the CPU (202) to, with the assignment module (111), assign a plurality of interleaving groups of programmable counters from a number of programmable counters (119) within a computing device. The microcontroller (250) further implements the functionality of, with the event sampling module (112), instructing the assigned interleaving groups of programmable counters to sample events occurring in a number of units within the computing device based on the assignment. The microcontroller (250) further implements the functionality of, with the reassignment module (113) and between samplings performed for the interleaving groups of programmable counters, reconfigure a number of the programmable counters (119) to execute a subsequent sampling of the events based on a subsequent assignment defined by a subsequent interleaving group of programmable counters.

In one example, the microcontroller (250) may be connected to the performance counters (118, 119) via a chained bus wherein each performance counters (118, 119) of each unit (117, 201 through 210) is connected in series along a common bus. In another example, the microcontroller (250) may be connected to the performance counters (118, 119) via a number of direct connections to the performance counters (118, 119) of each unit (117, 201 through 210). In still another example, the microcontroller (250) may be connected to the performance counters (118, 119) of each unit (117, 201 through 210) using a combination of the above connections.

In one example, the microcontroller (250) may be implemented on a motherboard of the computing system (100). In another example, the microcontroller may be connected to the computing device (116) to be analyzed. In this example, an external bus called a platform environment control interface (PECI) may be coupled between the microcontroller (205) and the computing device (116) to be analyzed in order to access the performance counter (118, 119) logic and resources inside each of the units (117, 201 through 210). The PECI bus provides access to a number of registers that control the CPU (202) functions. These registers may include the CSR and MSR mentioned above. The registers control and utilize the performance counters (118, 119) in each of the units (117, 201 through 210) are consequently available through the PECI bus.

In one example, a user may interface with the microcontroller (250) via a software package executed by, for example, the computing system (100) to control the performance counters (118, 119) and the sampling of events. In one example, the data collected in connection with the sampling of events may be locally stored by the microcontroller (250) and sent to a user. In another example, the data collected in connection with the sampling of events may be sent to a user in real time after each sampling period. In still another example, the data collected in connection with the sampling of events may be provided to a user in a mixture of real time and post processing as described in the above two examples. Further, in one example, interpolation of the sampled events may be performed by the microcontroller (250), by the interpolation module (114) executed by the processor (101), or a combination thereof.

Using a microcontroller (250) to execute the methods described herein presents several advantages. For example, one advantage is that no repercussions on the computing device (116) to be analyzed would be experienced since the modules (FIG. 1B, 110 through 115) executed by the processor (101) are not run or executed on the processors or other units (117, 201 through 210) under observation, but by an external independent resource using a hardware bus interface such as the PECI interface described above. Running or executing on the modules (FIG. 1B, 110 through 115) on the computing device (116) under test, does have side effects since it would use processor, operating system, and memory resources in parallel and, in some examples, in competition with the workload and/or application the user is trying to analyze with the performance counters (118, 119).

As another advantage, using a microcontroller (250) may remove dependencies from the operating system operating on the computing device (116) under test. This results in several advantages including no requirement of compiling software for a number of different operating systems since the modules (FIG. 1B, 110 through 115) are present in the examples described herein. Thus, use of appropriate drivers for each individual operating system such as the MSR and CSR registers is also not required. Instead, the present systems and methods are executed by the microcontroller (250) and not run or executed on the processors or other units (117, 201 through 210) under observation. Another advantage is that customers or users do not have to download different versions of software solution depending on their respective operating system. Still another advantage is that the present systems and methods drastically reduce the potential software incompatibility issues arising from customers deploying worldwide on various operating system types.

Still further, another advantage is that characterizing systems and applications in a lab environment is made much easier and faster since a user may connect their system (116) under test via the PECI bus to an external device or system that includes the microcontroller (250), and begin collection of hardware performance data without the need to stop a test under way, or install software on the system under test.

Figure 3:
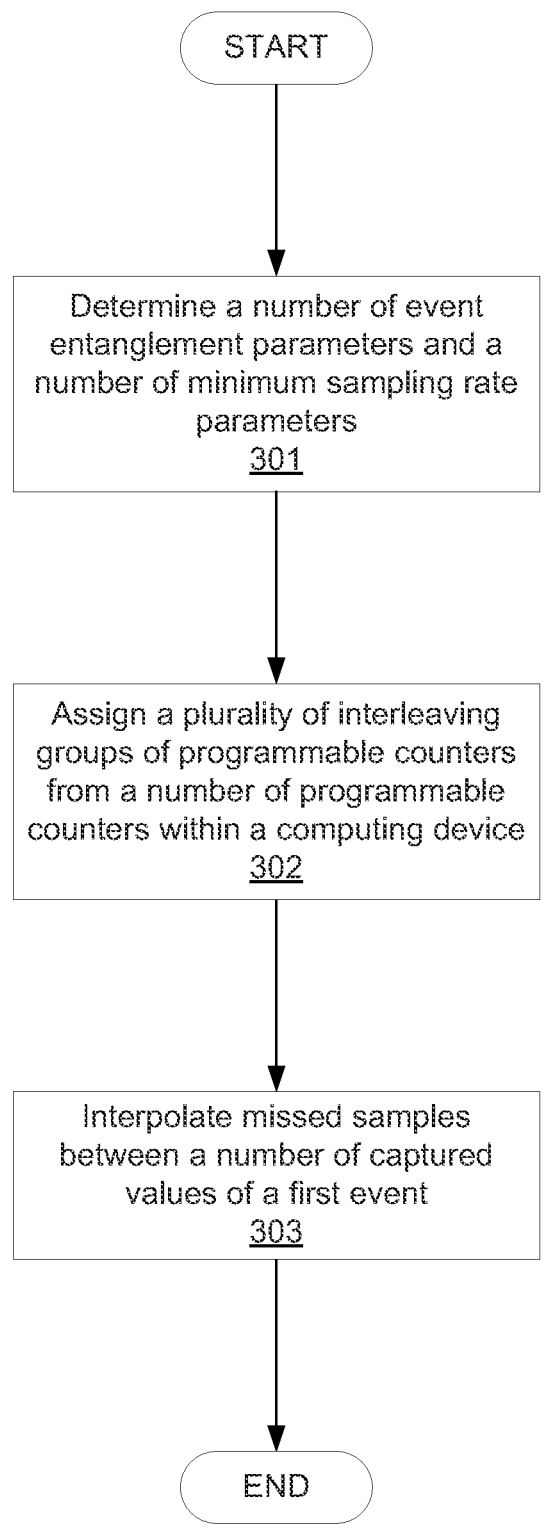
FIG. 3 is a flowchart depicting a method of collecting a number of hardware performance counters, according to one example of the principles described herein.

FIG. 3 is a flowchart depicting a method of collecting a number of hardware performance counters, according to one example of the principles described herein. The method may being by determining (block 301) a number of event entanglement parameters and a number of minimum sampling rate parameters. The method may continue by assigning (block 302) a plurality of interleaving groups of programmable counters from a number of programmable counters (119) within a computing device (116). The method may continue by interpolating (block 303) missed samples between a number of captured values of a first event. These different processes will now be described individually and collectively in more detail.

Figure 4:
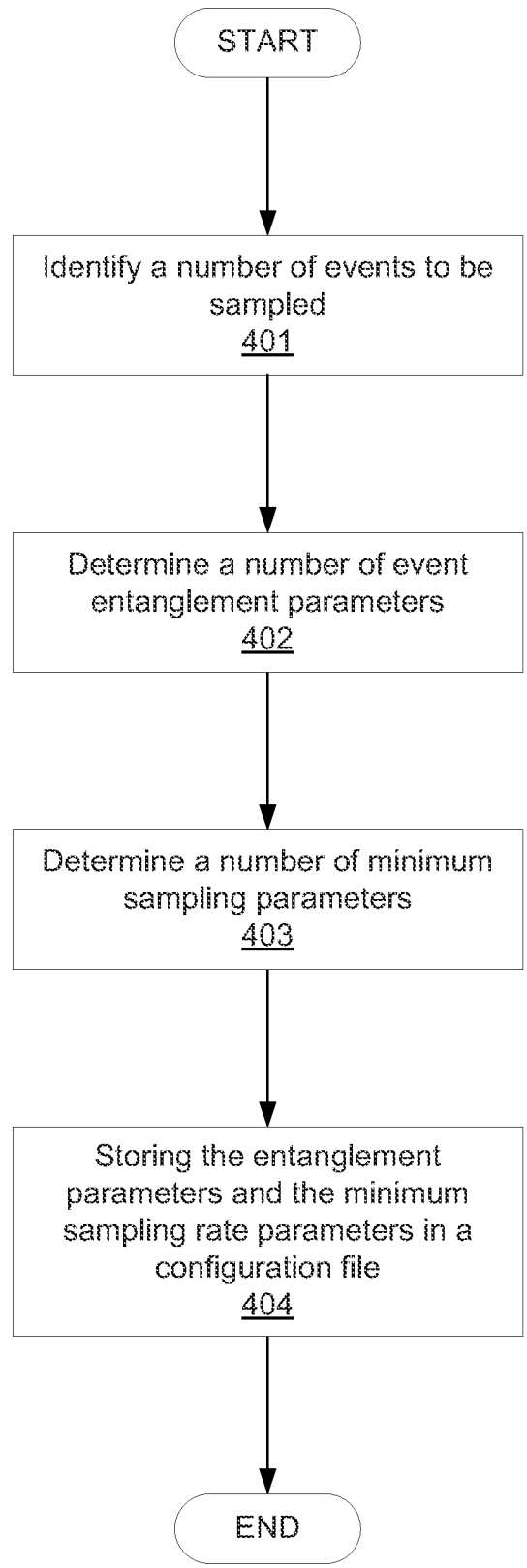
FIG. 4 is a flowchart depicting a method of setting a number of interleaving policies, according to one example of the principles described herein.

FIG. 4 is a flowchart depicting a method of setting a number of interleaving policies, according to one example of the principles described herein. In many instances, a user may desire dozens of events for each unit to be sampled so that the user may have a better idea of how a particular unit or a number of units (117, 201 through 210) are functioning within the analyzed computing device (116). This demand may be more than the counters available in a given unit (117, 201 through 210) may be able to handle. Further, a user may have specific event sampling requirements, and setting up a number of interleaving policies may take advantage of other resources such as fixed counters. Thus, the method of FIG. 4 may begin by identifying (block 401) a number of events to be sampled. In one example, a user may identify a number of events he or she would like to be sampled. In this example, the user may have a particular performance analysis he or she wishes to run. The user may select those events of interest that meet hat particular performance analysis. In another example, the computing system (100), executing the event parameter determination module (110), determine a number of events to be sampled based on already-selected events that require another event to be sampled in association with that already-selected event. These already-selected events may be user-selected events, events selected by default, or events selected by the computing device (100).

The method may continue by determining (block 402) a number of event entanglement parameters. Event entanglement describes a number of events that need to be sampled within the same sampling period, and cannot be separated or distributed over several sampling periods. This may be the case because of the inter-relationship that exists between the plurality of events or because of the users intention or desire for the plurality of events requires sampling them at the same time. One example of event entanglement may include calculating access latency. In this example, calculation access latency requires sampling occupancy events and insertion events within the same sampling period.

Thus, the user may define a number of event entanglement parameters, the computing system (100) executing the event parameter determination module (110) may automatically assign a number of event entanglement parameters based on the events associated with the event entanglement parameters, or combinations thereof.

The method may continue by determining (block 403) a number of minimum sampling rate parameters. Minimum sampling requirements describe a minimum sampling period rate at which to a specific event is sampled. For example, some types of events are captured or sampled purely for background monitoring and future reference. Consequently, these types of events may have relatively less frequent sampling requirements, with acquisition of a sample occurring every three or more sampling periods. However, other events may be critical to a number of analysis procedures and may require sampling at every sampling period. Some examples events that may be sampled at every sampling period include the reference clocks or the memory read and write request events.

Thus, the user may define a number of minimum sampling rate parameters, the computing system (100) executing the event parameter determination module (110) may automatically assign a number of minimum sampling rate parameters based on the events associated with the minimum sampling rate parameters, or combinations thereof.

The entanglement parameters and the minimum sampling rate parameters may be stored (block 404) in a configuration file. The configuration file would then be used to execute sampling of events in a number of sampling periods according to the parameters defined therein.

Having described the methods associated with determining a number of event interleaving policies, the methods associated with assigning a plurality of interleaving groups of programmable counters from a number of programmable counters will now be described.

Figure 5A:
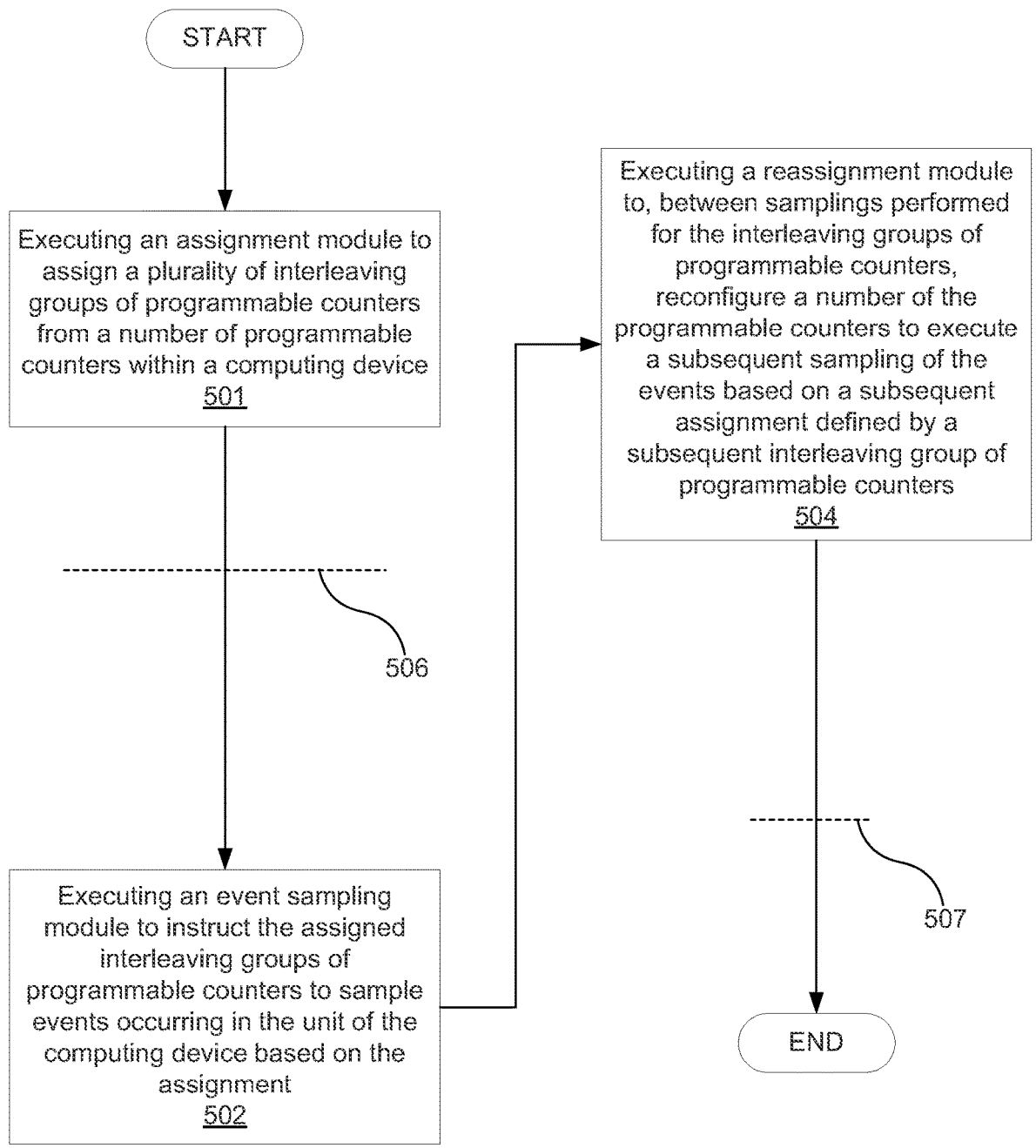
FIG. 5A is a flowchart depicting a method associated with assigning a plurality of interleaving groups of programmable counters from a number of programmable counters, according to one example of the principles described herein.

FIG. 5A is a flowchart depicting a method associated with assigning a plurality of interleaving groups of programmable counters from a number of programmable counters, according to one example of the principles described herein. The method of FIG. 5A may begin by executing (block 501) the assignment module (FIG. 1B, 111) to assign a plurality of interleaving groups of programmable counters from a number of programmable counters (119) within the computing device (116). The method of FIG. 5A may continue with executing (block 502) the event sampling module (FIG. 1B, 112) to instruct the assigned interleaving groups (603-1 through 603-3) of programmable counters (119) to sample events occurring in the unit of the computing device based on the assignment. Line 506 indicates the beginning of sampling of a number of events via the counters (118, 119). The method of FIG. 5A may continue by executing (block 504) a reassignment module to, between samplings performed for the interleaving groups of programmable counters (119), reconfigure a number of the programmable counters (119) to execute a subsequent sampling of the events based on a subsequent assignment defined by a subsequent interleaving group of programmable counters. The method of FIG. 5A will now be described in more detail in connection with FIG. 5B.

Figure 5B:
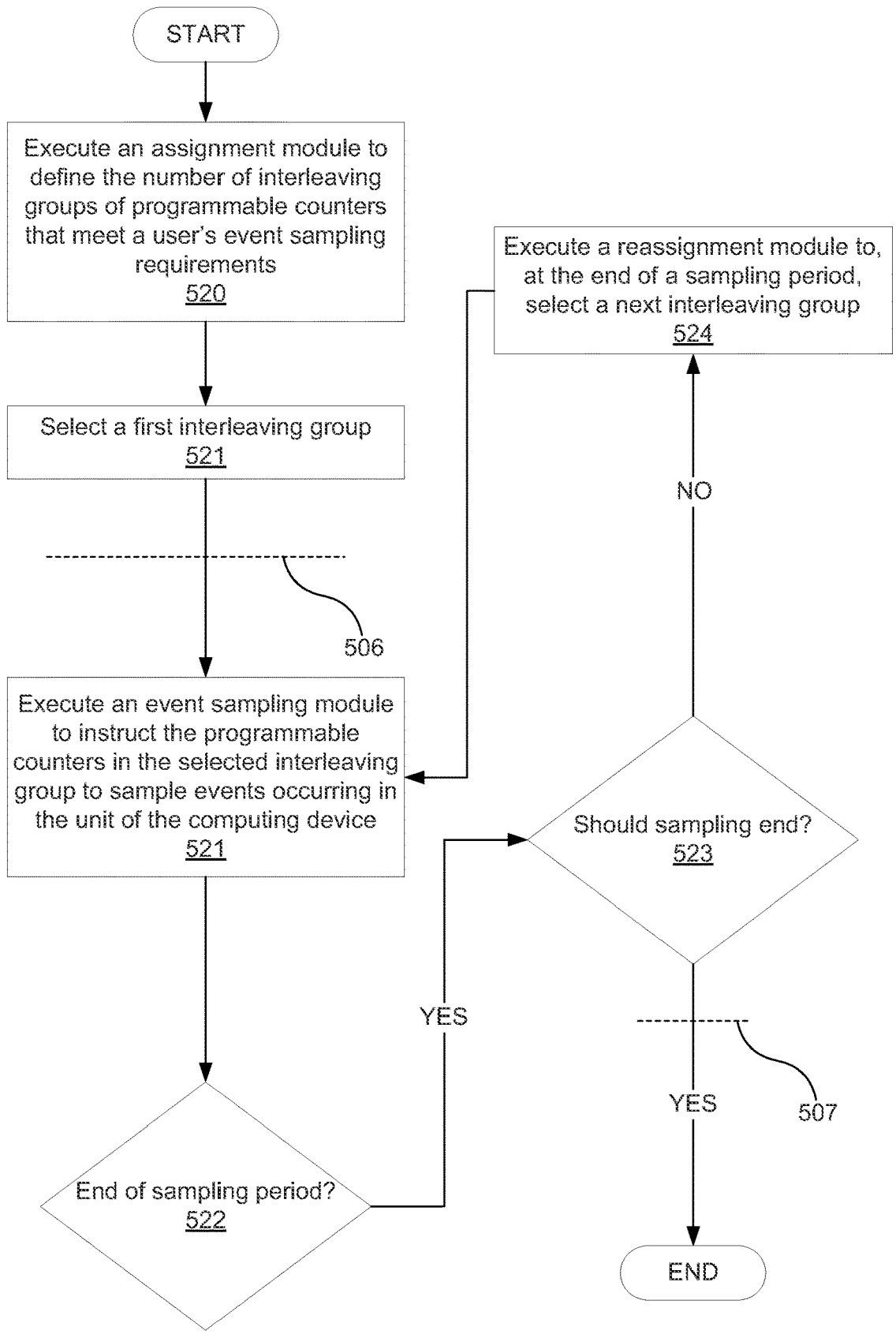
FIG. 5B is a flowchart depicting a method associated with assigning a plurality of interleaving groups of programmable counters from a number of programmable counters, according to another example of the principles described herein.

FIG. 5B is a flowchart depicting a method associated with assigning a plurality of interleaving groups of programmable counters (119) from a number of programmable counters, according to another example of the principles described herein. Once a number of events are identified, entanglement parameters and minimum sampling parameters are determined, and these identified events and parameters are stored in a configuration files, the configuration file may be used to interleave and sample a number of events.

The method may begin by executing (block 520) the assignment module (FIG. 1B, 111) to define a number of interleaving groups of programmable counters that meet a user's event sampling requirements. As mentioned above, the number of interleaving groups may be sampled a number of times in a cyclic manner. This will result in the event sampling module (112) sampling each event in each of the interleaving groups (603-1 through 603-3) for any number of iterations of the cyclic interleaving group sequence. Each interleaving group (603-1 through 603-3) assigns to a number of programmable counters (119) within a computing device (116) the event each programmable counter (119) will be sampling for the sampling period that interleaving group (603-1 through 603-3) will be active.

Figure 6:
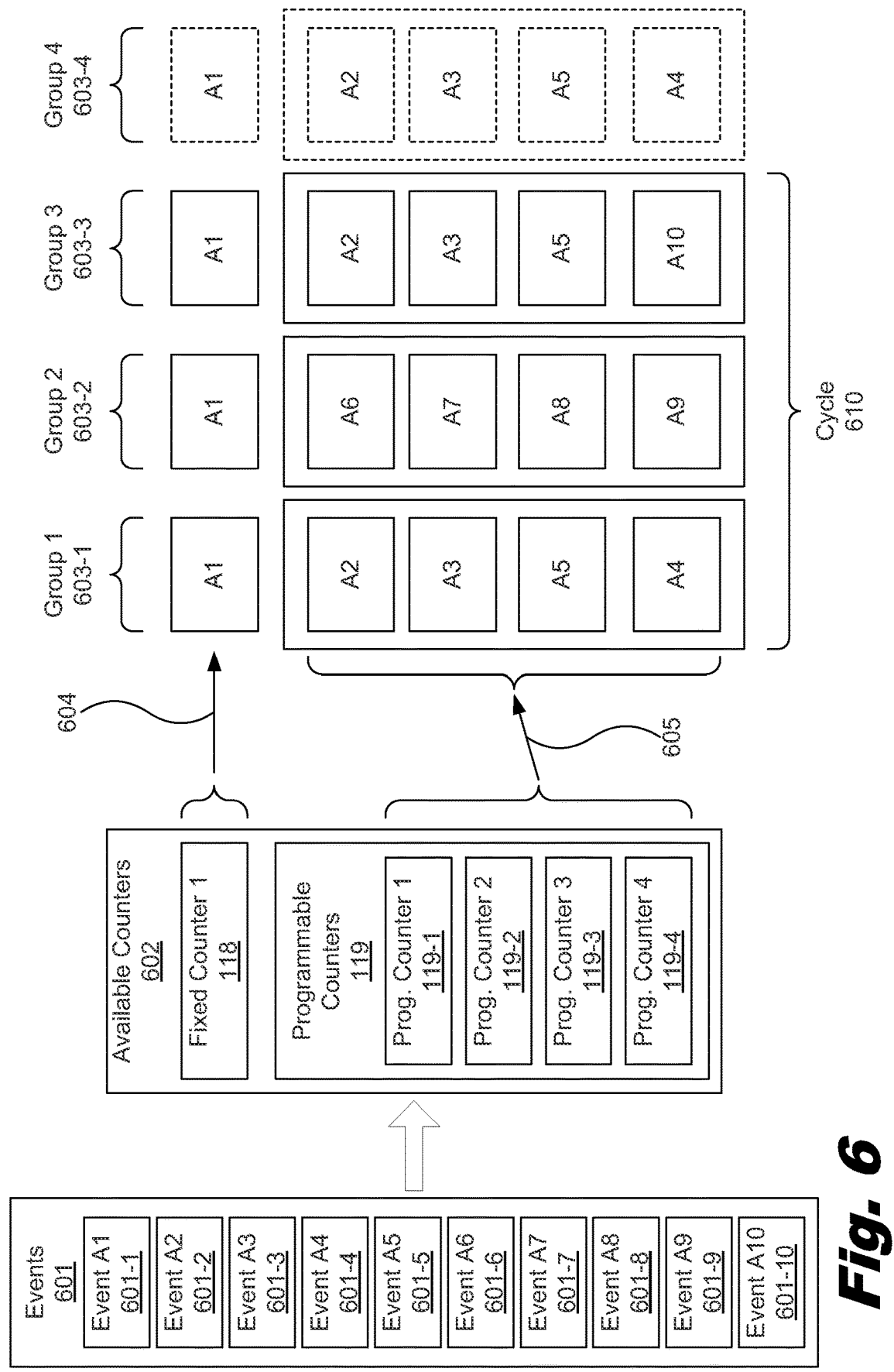
FIG. 6 is a block diagram of interleaving group assignments for a unit, according to one example of the principles described herein.

FIG. 6 is a block diagram of interleaving group assignments for a unit, according to one example of the principles described herein. The example of FIG. 6 will now be used in describing how the plurality of interleaving groups (603-1, 603-2, 603-3) of programmable counters are assigned and how the plurality of interleaving groups (603-1, 603-2, 603-3) form a cyclic interleaving group sequence (610).

A number of available counters (602) are identified in order to support the sampling of a number of events (601). The available counters include a number of fixed counters (118) and a number of programmable counters (119-1, 119-2, 119-3, 119-4). Although one fixed counter (118) and four programmable counters (119) are depicted in FIG. 6, any number of fixed counters (118) and programmable counters (119) may be utilized and assigned in a given example.

In order to assign the interleaving groups of programmable counters, the list of events obtained from blocks 401 through 404 of FIG. 4 are subjected to a number of rules. First, events that correspond to fixed counters (118) are assigned by the assignment module (FIG. 1B, 111) as indicated by arrow 604. Fixed counters (118) are counters that cannot be programmed or assigned or reprogrammed or reassigned, but are preprogrammed to sample instances of an event without variation, and may be permanently assigned to do so by a manufacturer of the unit. Considering fixed counters (118) first allows for the freeing up of a number of interleaving slots for a number of programmable counters (119). For example, if a user desires to sample an event (601-1 through 601-10) that a fixed counter (118) is already preprogrammed to sample, it would be ineffective to waist a programmable counter (119) as a sampling resource by having the programmable counter (119) sample the same event. Therefore, the assignment module (111) ensures that any event preassigned to a fixed counter (118) is not duplicatively assigned to a programmable counter (119). Assignment of programmable counters (119) as indicated by arrow 605 will now be described in more detail.

Second, an arbitrarily large number of interleaving groups (603-1 through 603-3) are created by the assignment module (FIG. 1B, 111) for sampling based on the number of events within the list of events obtained from blocks 401 through 404 of FIG. 4 such as Events A1 through A10 (601-1 through 601-10) of FIG. 6. In one example, the number of interleaving groups of fixed counters (118) and programmable counters (119) created is large enough to contain any interleaving assignment solution. In this example, the number of interleaving groups (603-1 through 603-3) may be approximately three interleaving groups so that enough sampling periods are created to sample enough instances of the each of the events. These three interleaving groups (603-1, 603-2, 603-3) form a cyclic interleaving group sequence wherein the three interleaving groups (603-1, 603-2, 603-3) may be sampled in order any number of iterations or cycles. This is evidenced by the fourth interleaving group (603-4) being identical to the first interleaving group (603-1). If a fifth interleaving group were depicted in FIG. 6, the fifth interleaving group would be identical to the second interleaving group (603-2). Similarly, if a sixth interleaving group were depicted in FIG. 6, the sixth interleaving group would be identical to the third interleaving group (603-3). This pattern of interleaving groups may be used to sample events via the programmable counters (119) any number of cycles.

Here, in the example of FIG. 6, the smallest cyclic interleaving group sequence appropriate is three interleaving groups (603-1, 603-2, 603-3) since by interleaving group three (603-3) all the user's event sampling requirements have been met. However, although only three interleaving groups (603-1, 603-2, 603-3) are utilized in the example of FIG. 6, fewer or more interleaving groups may be created in order to meet the user's event sampling requirements. Also, as will be described in more detail below, a number of policies may be applied to determine the number of interleaving groups (603-1, 603-2, 603-3) to include within the cyclic interleaving group sequence. These policies include short sequence (i.e. sequence with the least number of interleaving groups), symmetry assignment based on a guiding event, and StopAt used to indicate when the computing system (100) is to stop creating interleaving groups past a number of interleaving groups (i.e., the last interleaving group in the sequence after which sampling cycles back to the first interleaving group).

Third, entangled events with the most stringent minimum sampling requirements (i.e., the highest sampling rate) as defined by the configuration file created at block 404 of FIG. 4 are assigned by the assignment module (FIG. 1B, 111). In one example, these entangled events with the most stringent minimum sampling requirements are assigned to the first interleaving group (603-1), and to every $n^{th}$ interleaving group where n is the modulo (i.e. the remainder in Euclidian division) of the minimum sampling requirement. The modulo operation determines the remainder of division of one number by another. In this case, given the total number of interleaving groups as the dividend a, and n as the divisor, modulo n is the remainder of this Euclidean division of a by n.

Fourth, an entangled event with the next most stringent minimum sampling requirement is assigned by the assignment module (FIG. 1B, 111). The assignment of the entangled events with decreasingly stringent minimum sampling requirements are assigned by the assignment module (FIG. 1B, 111) in this order until no entangled events remain. In one example, if a number of entangled events have the same minimum sampling requirements, the assignment module (FIG. 1B, 111) assigns first those entangled events with the largest number of events. For example, if A3 (601-3), A7 (601-7), and A8 (601-8) are entangled events, these three events are assigned before the entangled events A2 (601-2) and A5 (601-5) are assigned since there are three entangled events in A3 (601-3), A7 (601-7), and A8 (601-8) whereas there are only two entangled events in A2 (601-2) and A5 (601-5).

Fifth, if too many entangling rules or minimum sampling requirements are created, an interleaving group solution may not be possible. In this example, the assignment module (FIG. 15, 111) detects this condition when any one of two conditions exist. One of the two conditions is if there is no interleaving group left with enough counters (118, 119) left for assigning the entangled events. A second one of the two conditions is if there is no interleaving group left that will satisfy the minimum sampling requirement of the entangled events left. If either of these conditions exist, feedback is given to the user that enforcement of all the requirements is not possible, and that the user of the assignment module (FIG. 1B, 111) must alter the assignment of the events (601) to the counters (118, 119).

Once a number of entangled events (601) have been assigned, a number of single, non-entangled events (601) are assigned by the assignment module (FIG. 1B, 111). Thus, sixth, single events (601) with the most stringent minimum sampling requirements are assigned first to one of the interleaving groups (603-1, 603-2, 603-3).

Seventh, a single non-entangled event (601) with the next most stringent minimum sampling requirement is assigned by the assignment module (FIG. 1B, 111). The assignment of the single, non-entangled events with decreasingly stringent minimum sampling requirements are assigned by the assignment module (FIG. 1B, 111) in this order until no single, non-entangled events remain.

Eighth, it is possible that after assigning the entangled events (601), there is not enough slots within the interleaving groups (603-1, 603-2, 603-3) left for some of the single, non-entangled events (601) to satisfy each event's minimum sampling requirement. In such a situation, feedback is given to the user that enforcement of all the requirements is not possible, and that the user of the assignment module (FIG. 1B, 111) must alter the assignment of the events (601) to the counters (118, 119).

Ninth, if counters (118, 119) are still unassigned in some of the interleaving groups (603-1, 603-2, 603-3), any single or entangled event that would fit into a slot is assigned. In one example, single or entangled event that would fit into a slot are assigned either arbitrarily or by prioritization based on each event's entangling requirement, minimum sampling requirements, or both.

Thus, in order to assign the interleaving groups of programmable counters (119), the list of events obtained from blocks 401 through 404 of FIG. 4 are subjected to the above rules or other rules. In one example, the above rules may be applied in order as presented above. In another example, the above rules may be applied in any order. In still another example, less than all the above rules may be applied in assigning the interleaving groups of programmable counters (119).

The policy for the total number of interleaving groups (603-1 through 603-3) may be based on a number of conditions. One such condition includes stopping creation of interleaving groups (603-1 through 603-3) when the last of the interleaving groups (603-1 through 603-3) is the one at which all of the list of events, entangling, and minimum sampling requirements have been met. This condition may be referred to as "a short cyclic interleaving group sequence policy." For example, in FIG. 6, the cyclic interleaving group sequence may be only three interleaving groups long since by interleaving group three (603-3) all the user requirements have been met in terms of entanglement, minimum sampling requirements, and number of events to sample.

Another such condition includes a symmetric cyclic interleaving group sequence policy wherein the last group is the one satisfying the "short" condition described above, but also when a sampling symmetry for a particular "guiding" event is defined by the user.

The symmetry for a guiding event may be defined as a "cadence." For example, a symmetric version of a sequence for A2 as depicted in FIG. 6 may include sampling A2 in a first sampling period, interpolating A2 for a second sampling period, sampling A2 in a third sampling period, interpolating A2 for a fourth sampling period, sampling A2 in a fifth sampling period, and so on throughout the iterations of the cyclic interleaving group sequence. In this example, the symmetry or "cadence" of A2 is maintained. This symmetry for a guiding event may be used as a policy for determining a total number of interleaving group (603-1 through 603-3) within the cyclic interleaving group sequence.

The cycle (610) includes a number of groups required to satisfy the list of events, and the entangling and minimum sampling requirements set forth by the user and the event parameter determination module (FIG. 1, 110) and assignment module (FIG. 1, 111). In this manner, the number of interleaving groups (603-1 through 603-3) within a cycle (610) is dependent on and defined by the list of events, and the entangling and minimum sampling requirements. In this manner, the assignment and sampling of events occurring within the units (117, 201 through 210) is performed based a user's requirements in order to meet those requirements.

As described herein, the first interleaving group (603-1) is assigned using the event parameter determination module (FIG. 1, 110) and assignment module (FIG. 1, 111) utilizing the outcome of the event parameter determination module (FIG. 1, 110) in assigning the counters (118, 119) to a number of events. The same is performed for each subsequent interleaving group such as interleaving groups 603-2 and 603-3 using the reassignment module (FIG. 1, 113). Thus, the counters (118, 119) are assigned to a number of events before the commencement of the sampling of events within the first interleaving group (603-1), and between each sampling of the interleaving groups (603-1 through 603-3). Although only three interleaving groups (603-1 through 603-3) are depicted in FIG. 6 as forming a cycle (610), any number of interleaving groups may be assigned within a cycle (610) based on the list of events, and the entangling and minimum sampling requirements.

Still another such condition a fixed-length cyclic interleaving group sequence policy that is based on a predefined number of interleaving groups (603-1 through 603-3). In one example, the number may be much larger than the minimum number of interleaving groups (603-1 through 603-3) required to satisfy the list of event, entangling, and minimum sampling requirements. This condition may be referred to as the "stop at" (StopAt) condition. Under this condition, if the stop at value is larger than the minimum number of interleaving groups (603-1 through 603-3) required to satisfy the list of event, entangling, and minimum sampling requirements, then the first interleaving group (603-1) and the following interleaving groups may be repeated up to that stop at number, or the assignment module (FIG. 1B, 111) may just keep filling up to the stop at number of interleaving groups (603-1 through 603-3) using the logic described above. In the example of FIG. 6, if a StopAt value equals five, and this was set as the policy for the total number of interleaving groups (603-1 through 603-3), then the first interleaving group (603-1) and the second interleaving group (603-2) may be repeated as the fourth interleaving group (603-4) and a fifth interleaving group. The fifth interleaving group would then represent the end of the cyclic interleaving group sequence.

If, however, the stop at value is shorter than the minimum number of interleaving groups (603-1 through 603-3) required to satisfy the list of event, entangling, and minimum sampling requirements, then the StopAt value may be used as an overruling condition. For example, if the StopAt value equals two in the example of FIG. 6, then the first interleaving group (603-1) and the second interleaving group (603-2) would be included in the cyclic interleaving group sequences and sampled, and the creation of interleaving groups (603-1 through 603-3) would end after the second interleaving group (603-2) instead of including the minimum number of three interleaving groups (603-1 through 603-3) to meet the requirements.

Turning again to FIG. 5B, the method may continue by selection a first interleaving group such as, for example, interleaving group (603-1). The event sampling module (FIG. 1B, 112) is executed (block 521) to instruct the programmable counters (119) in the selected interleaving group to sample events occurring in the unit (117, 201 through 210) of the computing device (116). Line 506 indicates the beginning of sampling of a number of events via the counters (118, 119). In one example, the assignment module (FIG. 1B, 111) and event sampling module (FIG. 1B, 112) together establish, start, stop, and collect hardware performance counters based on a unit's manufacturer specifications, and the assigned plurality of interleaving groups of programmable counters assigned at block 520.

A number of techniques may be used to start the counters, stop the counters, read data from the counters, and reassign the counters between the interleaving groups (603-1, 603-2, 603-3). These techniques include free running techniques, global start and stop mechanisms at the unit level, and controls at the counter level, among other techniques. In one example, the techniques may be based on documented techniques provided in the unit manufacturer's specifications. All these techniques may be used indifferently, or as preferred, in the context of this disclosure.

The method of FIG. 5B may continue with determining (block 522) whether the end of a sampling period has been reached. If the end of the sampling period has not been reached, then the method waits until that sampling period is completed. If the end of the sampling period has been reached (block 522, determination YES), then a determination (block 523) as to whether sampling should end is made. For example, if a number of cyclic interleaving group sequences reach a defined number of cycles, then the sampling may end. In this example, the computing system (100) or a user may define the number of cycles. In another example, a user may request that sampling end at which point the computing system (100) stops the sampling of events of the interleaving groups (603-1 through 603-3). In still another example, the cyclic interleaving group sequences may continue for a number of cycles until a user workload has been executed by the computing system (100). Other actions, rules, or parameters may define whether or not sampling should end. If sampling should end (block 523, determination YES), then sampling ends as indicated by line 507, and the method terminates.

If, however, the sampling should end (block 523, determination YES), then the computing system (100), executes (block 524) a reassignment module to, at the end of the sampling period, select a next interleaving group (603-1 through 603-3) to sample. A number of programmable counters (119) may be reconfigured between sampling periods in order to obtain additional information regarding the performance of the units (117, 201 through 210). For example, the first programmable counter (119) in unit A is reconfigured through execution of the reassignment module (FIG. 1B, 113) to capture event A6 in sampling period 2, and then reconfigured to capture event A2 in sampling period 3. The first programmable counter (119) it is not reconfigured in sampling period 4 since the Interleaving Assignment Algorithm, in this example, determined that event A2 will be counted for the two consecutive sampling periods 3 and 4. Also, event A10 is depicted in Table 1 as being sampled in sampling period 3. When event A10 is sampled by programmable counter 3, event A4 is not sampled because events A2, A3, A5 and A10 are the four events sampled in sampling period 3. Thus, programmable counter ProgA. 3 is reconfigured to sample event A10 in sample period 3 instead of event A4, for example.

The method then returns to block 521 where that next interleaving group (603-1 through 603-3) of events is sampled. In this manner, all the interleaving groups (603-1 through 603-3) are sampled in turn, and any number of cyclic interleaving group sequences obtained through a corresponding number of iterations of blocks 521 through 524.

To implement the interleaved counter sampling technique described herein, the reassignment module (FIG. 1B, 113) reassigns or reconfigures the counters (118, 119) between or at the beginning of every sampling period. Table 1 depicts the results of sampling the interleaved events, according to one example of the principles described herein. The designations "A" and "B" indicate that two units are being analyzed simultaneously; unit A and unit B. Each unit may include a number of fixed counters (118) and a number of programmable counters (119). Further, the policy for the total number of interleaving groups to sample is Short.

TABLE 1

| | | \multicolumn{6}{c}{Results of Interleaved Event Sampling} | | | | | |
|---|---|---|---|---|---|---|---|
| Counter | Event | SP #1 (IG1) | SP #2 (IG2) | SP #3 (IG3) | SP #4 (IG1) | SP #5 (IG2) | SP #6 (IG3) |
| FixedA 1 | A1 | A1(1) | A1(2) | A1(3) | A1(4) | A1(5) | ... |
| ProgA. 1 | A2 | A2(1) | I | A2(3) | A2(4) | I | ... |
| ProgA. 2 | A3 | A3(1) | I | A3(3) | A3(4) | I | ... |
| ProgA. 3 | A4 | A4(1) | I | I | A4(4) | I | ... |
| ProgA. 4 | A5 | A5(1) | I | A5(3) | A5(4) | I | ... |
| ProgA. 1 | A6 | I | A6(2) | I | I | A6(5) | ... |
| ProgA. 2 | A7 | I | A7(2) | I | I | A7(5) | ... |
| ProgA. 3 | A8 | I | A8(2) | I | I | A8(5) | ... |
| ProgA. 4 | A9 | I | A9(2) | I | I | A9(5) | ... |
| ProgA. 3 | A10 | I | I | A10(3) | I | I | ... |
| ProgB. 1 | B1 | B1(1) | B1(2) | B1(3) | B1(4) | B1(5) | ... |
| ProgB. 2 | B2 | B2(1) | B2(2) | B2(3) | B2(4) | B2(5) | ... |
| ProgB. 3 | B3 | B3(1) | B3(2) | B3(3) | B3(4) | B3(5) | ... |
| ProgB. 4 | B4 | B4(1) | B4(2) | B4(3) | B4(4) | B4(5) | ... |

The event sampling results depicted in Table 1 are only one example of sampling results. Different results are obtained by altering the various parameters, conditions, and rules described above. In Table 1, the sampling periods coordinate with the interleaving groups as designated by the columns labeled SP #1 (IG1), SP #2 (IG2), SP #3 (IG3), SP #4 (IG4), SP #5 (IG5), and SP #6 (IG6). As mentioned above in connection with FIG. 6, sampling periods 1, 2, and 3 representing values sampled for interleaving groups (603-1, 603-2, 603-3) form a cyclic interleaving group sequence (610), and that same cyclic interleaving group sequence (610) is depicted in Table 1. Table 1, however, depicts the pattern created by the cyclic interleaving group sequence (610) and its associated interleaving groups (603-1 through 603-3) extrapolated out to a fifth sampling period. The ellipses depicted under sampling period number 6 indicating that the same pattern continues until a defined number of cycles has been reached, until a user requests the sampling to end, or until a user workload has been executed by the computing system (100).

In addition, as depicted in Table 1, event A1 is a fixed counter (118), whereas the remainder of the counters in Table 1 are programmable counters (119). As to unit A, events A2 through A10 are assigned to four programmable counters. Therefore, in this example, only four events within unit A are sampled in a given sampling period. Those events that are not sampled in a given sampling period are indicated with the letter "I" to indicate that those values are to be interpolated. These interpolation techniques will be described in more detail below.

As depicted in Table 1, programmable counters (119) labeled ProgB. 1, ProgB. 2. ProgB. 3, and ProgB. 4 are programmable counters for unit B. In this example, unit B's programmable counters (119) are not being reconfigured between sampling periods as each of the unit B counters (118, 119) (all four, for example) are utilized for only four separate events. Therefore, as to unit B, the reassignment module (113) is not executed.

Having described the methods associated with determining a number of event interleaving policies, and assigning a plurality of interleaving groups of programmable counters from a number of programmable counters based on the event interleaving policies, interpolation of missed samples between a number of the captured values will now be described.

Figure 7:
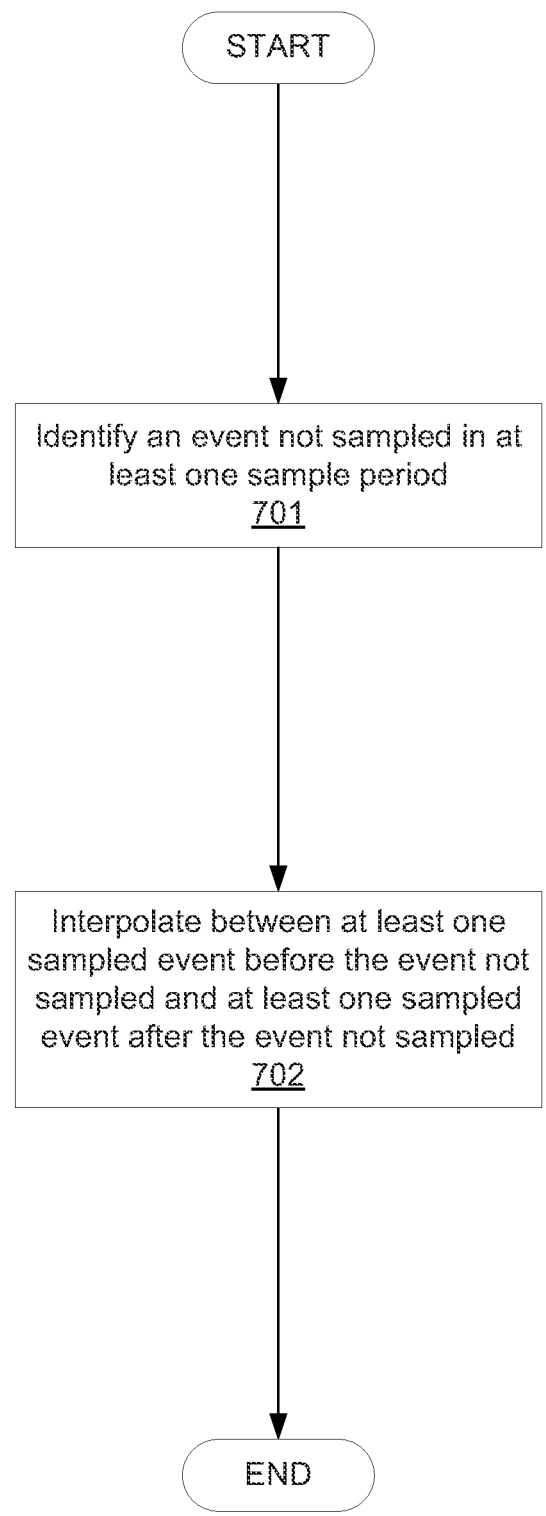
FIG. 7 is a flowchart depicting a method of interpolating a number of missed samples between a number of captured values, according to one example of the principles described herein.

FIG. 7 is a flowchart depicting a method of interpolating a number of missed samples between a number of captured values, according to one example of the principles described herein. The method of FIG. 7 may begin by identifying (block 701), with the interpolation module (FIG. 1B, 114), an event not sampled in at least one sample period. As depicted in Table 1 above, a number of events were not able to be sampled in every sample period. For example, events A6 through A9 were not sampled in sample period 1, events A2 through A5 and A10 were not sampled in sample period 2, events A4 and A6 through A9 were not sampled in sample period 3, events A6 through A10 were not sampled in sample period 4, and events A2 through A5 and A10 were not sampled in sample period 5. Thus, as one of many examples in Table 1, event A2 was not sampled in sample period 2 between event A2 being sampled in sample periods 1 and 3.

Any number of consecutive non-samplings of an event may occur. For example, one instance of a non-sampling of event A2 occurred between sample periods 1 and 3 in the example of Table 1, In contrast, two instances of a non-sampling of event A6 occurred between sample periods 2 and 5 in the example of Table 1. As will be described in more detail below, interpolation may be performed in instances where a single non-sampling instance occurs, or when a plurality of non-sampling instances occurs.

The method of FIG. 7 may continue by interpolating (block 702), with the interpolation module (FIG. 1B, 114), between at least one sampled event before the event that was not sampled and at least one sampled event after the event that was not sampled.

Once the samples have been collected, the interpolation module (FIG. 1B, 114) estimates values for the missing samples indicated with an "I" in Table 1; "I" standing for interpolation. In one example, execution of the interpolation module (FIG. 1B, 114) to interpolate the missing samples may be performed in real time. In this example, the missed samples are interpolated as enough values are made available to the computing system (100). In one example, enough samples may include at least one sample before a number of missed samples, and at least one sample after the number of missed samples.

In another example, execution of the interpolation module (FIG. 1B, 114) to interpolate the missing samples may be performed after completion of the sampling periods corresponding to a cyclic interleaving group sequence. In this example, the interpolation is performed after the storage module (FIG. 1B, 115) has stored the samples from the cyclic interleaving group sequence. In still another example, the interpolation may be performed after completion of all cyclic interleaving group sequences or a number of cyclic interleaving group sequences of the user's workload or application. In this example, interpolation may occur after sampling of large numbers of cyclic interleaving group sequences.

The interpolation module (FIG. 1B, 115) interpolates between two sampled values representing events. In one example, the interpolation is weighted by the evolution of a reference clock (RefClock) for the unit (117). RefClocks are available in each Unit or have a proxy in another unit. The RefClock is used by the interpolation module (114) to capture the number of clocks elapsed during the sampling period for a specific unit (117). In one example, the event sampling module (FIG. 13, 112) samples events using the counters (118, 119) at a fixed rate, such as, for example, once every second.

However, heavy system workloads may prevent the operating system of the analyzed computing device (116) from scheduling the execution of the event sampling module (112) in a timely fashion. In some cases, these heavy workloads may increase a sampling period by a factor of ten. RefClocks are not interleaved, and are captured at each sample period. Consequently, the RefClocks each reflect the actual period that elapsed for the sample from the unit (117).

An example of a RefClock captured at each sample is the PCU's (FIG. 2, 207) "ClockTicks" event which is the main clock for the counters associated with the encore units in the processor. ClockTicks is a fixed 800 MHz clock developed by Intel Corporation for a number of its processors. Cores (FIG. 2, 204) also have a time-invariant RefClock called time stamp counter (TSC). The interpolation module (114) weighs the interpolation result based on the RefClock evolution between the existing samples and the samples to interpolate.

The interpolation module (FIG. 1B, 114) utilizes a linear interpolation of the accumulation rates (AR). Accumulation rates are measured in event occurrences per second. ARs represent the average rate at which samples accumulate during one sampling period. For instance, if a counter captures 10 occurrences of an event during a 1 second sampling period, the AR is 10 events per second. By linearly interpolating between the ARs of 2 real samples, the rate at which that event would have been captured for interleaved sampling periods in between the real sampled periods may be approximated.

Figure 8:
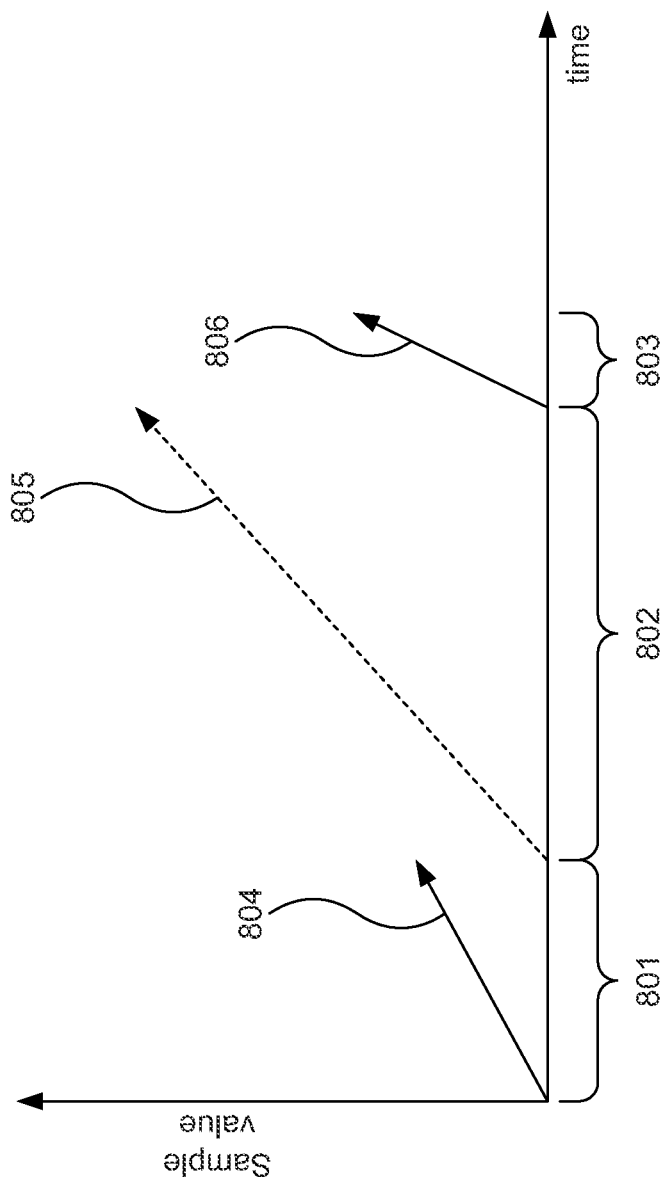
FIG. 8 is a graph of a RefClock weighted interpolation of an interleaved sample, according to one example of the principles described herein.

FIG. 8 is a graph of a RefClock weighted interpolation of an interleaved sample, according to one example of the principles described herein. As depicted in the graph of FIG. 8, three sampling periods (801, 802, 803) are represented, in the example of FIG. 8, the event sampled is event A2 from Table 1. Lines 804 and 806 represent the AR of event A2 during sampling period 1 (801) and sampling period 3 (803), and are real values obtained during sampling as opposed to interpolated values. Line 805 represents an interpolated value for event A2 during sampling period 2 (802). Since A2 was not sampled during sampling period 2 (802), this value is interpolated. As can be seen in the respective slopes of the two sampled values (804, 806) relative to the interpolated value (805), interpolation is performed based on the AR of the sampled values (804, 806). As to this RefClock weighted linear Interpolation equation, an accumulation rate for the single interleave example above may be expressed as follows:

$$AR_2 = AR_1 + (AR_3 - AR_1) \times P_2/(P_2 + P_3)$$

where P is the RefClock period.

The resulting interleaved sample value (IV) during sample period 2 (802) is $IV_2 = P_2 \times AR_2$. As mentioned above, more than one missed sampling of an event may occur between two actual samplings of that event. Thus, a generalized equation to N number of missed interleaved samples, for sample number (i), i varying from 2 to N+1, is as follows:

$$AR_i = AR_1 + (AR(N+2) - AR_1) \times SUM(n=2 \ldots I)(P(n))/SUM(n=2 \ldots N+2)(P(n))$$

Further, a generalized interleaved sample value may be expressed as $IV = P_i \times AR_i$.

The linear interpolation technique described above supposes that an event's accumulation rate evolves linearly over time. However, this is not the case in many instances such as, for example, in the case of bursts of activities within the unit (FIG. 1B, 117). Further, other techniques may be considered as well such as, for example, polynomial interpolation of the accumulation rates, weighted by RefClock evolution. Even though various techniques may have limitations, presenting interpolated values to a user is a powerful aid when analyzing the results of event sampling. This may especially be true when graphing results or performing statistical analysis at each sampling period.

In one example, to avoid possible misinterpretation of results based on the interpolated sample, the interpolation module (FIG. 1B, 114) flags every sample value that is the result of an interpolation. For example, the interpolation module (FIG. 1B, 114) may use the indicator "IV" to indicate to a user that that value is an interpolated value. In another example, graphing software that may be used to plot such interpolated samples with a marker of a different shape, color, or other distinguishing indicator. Consequently, the user of the interpolation process of FIG. 7 and associated analysis algorithms may easily recognize samples that have been interpolated. An example of this is depicted in Table 2. Table 2 contains the results of the collected samples of the example of Table 1 and including the RefClock weighted interpolated values. The interpolated values are shown in bold font.

TABLE 2

Results with clock-weighted interpolated samples

| Counter | Event | SP #1 (IG1) | SP #2 (IG2) | SP #3 (IG3) | SP #4 (IG1) | SP #5 (IG2) |
|---|---|---|---|---|---|---|
| FixedA 1 | A1 | A1(1) | A1(2) | A1(3) | A1(4) | A1(5) |
| ProgA. 1 | A2 | A2(1) | A2-IV(2) | A2(3) | A2(4) | A2-IV(5) |
| ProgA. 2 | A3 | A3(1) | A3-IV(2) | A3(3) | A3(4) | A3-IV(5) |
| ProgA. 3 | A4 | A4(1) | A4-IV(2) | A4-IV(3) | A4(4) | A4-IV(5) |
| ProgA. 4 | A5 | A5(1) | A5-IV(2) | A5(3) | A5(4) | A5-IV(5) |
| ProgA. 1 | A6 | A6-IV(1) | A6(2) | A6-IV(3) | A6-IV(4) | A6(5) |
| ProgA. 2 | A7 | A7-IV(1) | A7(2) | A7-IV(3) | A7-IV(4) | A7(5) |
| ProgA. 3 | A8 | A8-IV(1) | A8(2) | A8-IV(3) | A8-IV(4) | A8(5) |
| ProgA. 4 | A9 | A9-IV(1) | A9(2) | A9-IV(3) | A9-IV(4) | A9(5) |
| ProgA. 3 | A10 | A10-IV(1) | A10-IV(2) | A10(3) | A10-IV(4) | A10-IV(5) |
| ProgB. 1 | B1 | B1(1) | B1(2) | B1(3) | B1(4) | B1(5) |
| ProgB. 2 | B2 | B2(1) | B2(2) | B2(3) | B2(4) | B2(5) |
| ProgB. 3 | B3 | B3(1) | B3(2) | B3(3) | B3(4) | B3(5) |
| ProgB. 4 | B4 | B4(1) | B4(2) | B4(3) | B4(4) | B4(5) |

Values for event A10 were interpolated in sample periods 1, 2, 4, and 5 before and after an actual sample of event A10 was obtained. In this instance, there are no previous or subsequent actual values to interpolate from. For interleaved samples without a leading or trailing actual sampled value at the start of a run, or at the end of the run, respectively, the assumed "actual" values for the interpolation method can be defined using a number of methods. For example, the interpolation module (FIG. 1B, 114) may employ a zero value method, an idle value method, a method using values from the next or previous real sample from a separate run, an interpolation algorithm different from that described above, or other methods.

Upon completion of the interpolation method of FIG. 7 for each interleaved event and sample, the results are stored in a data storage device through execution of the storage module (115), recorded in a number of results file, passed to a user or computer program that requested the data, or combinations thereof. For example, a user may use the event samples collected to analyze the performance characteristics and the architecture bottlenecks of the analyzed computing device (116) and its various units (117) when running workstation applications and workloads.

Figure 9:
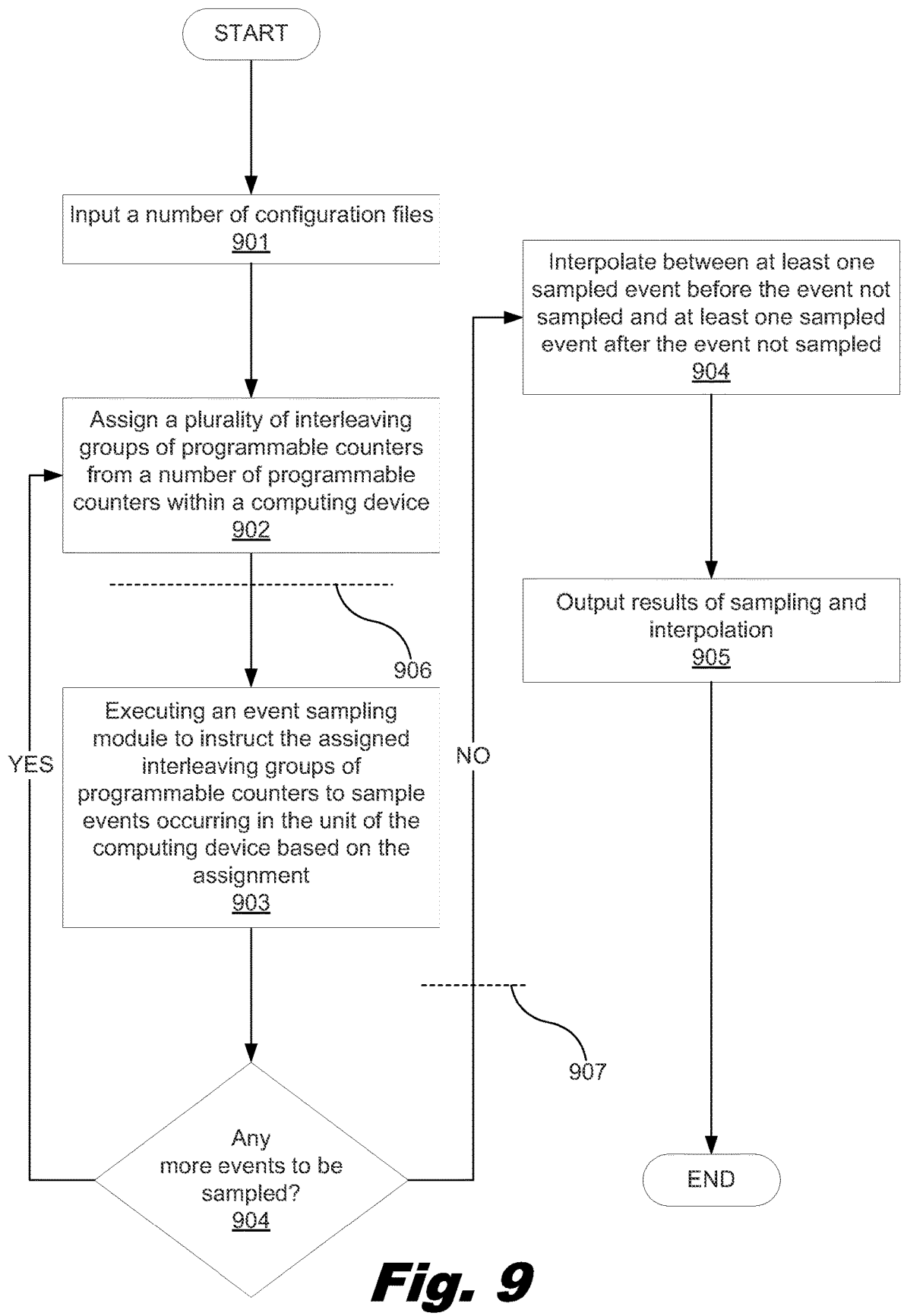
FIG. 9 is a flowchart depicting an overview method of collecting hardware performance data, according to one example of the principles described herein.

FIG. 9 is a flowchart depicting an overview method of collecting hardware performance data, according to one example of the principles described herein. The method of FIG. 9 may be a collection of the methods described in connection with FIGS. 3, 4, 5A, 5B, and 7. The details of FIGS. 3, 4, 5A, 5B, and 7 are incorporated into FIG. 9. The method of FIG. 9 may begin by inputting (block 901) a number of configuration files such as a number of PCCFG files. The method of FIG. 4 and the associated description above provides details for creation of the configuration files.

The method of FIG. 9 may continue by assigning (block 902) a plurality of interleaving groups (603-1 through 603-3) of programmable counters (119) from a number of programmable counters within a computing device (116) to be analyzed. The methods of FIGS. 3, 4, 5A, and 5B and the associated description above provide details regarding the assignment (block 902) of the interleaving groups (603-1 through 603-3).

Sampling begins as indicated by line 506 by executing (block 903) the event sampling module (FIG. 1B, 112) to instruct the assigned interleaving groups (603-1 through 603-3) of programmable counters (119) to sample events occurring in the unit of the computing device (116) based on the assignment. The methods of FIGS. 5A and 5B and the associated description above provide details regarding the sampling (block 903) of the interleaving groups (603-1 through 603-3). A determination is made at block 904 as to whether any more events are to be sampled. If additional events are to be sampled (block 904, determination YES), then the method of FIG. 9 loops back to block 902. The looping from block 904 to 902 provides for all the interleaving groups (603-1 through 603-3) to be sampled in turn, and any number of cyclic interleaving group sequences obtained through a corresponding number of iterations of block 902 to 904 as similarly obtained through a number of iterations of blocks 521 through 524 of FIG. 5.

If additional events are not to be sampled (block 904, determination NO), the method of FIG. 9 may continue by interpolating (block 904), with the interpolation module (FIG. 1B, 114), between at least one sampled event before the event that was not sampled and at least one sampled event after the event that was not sampled. Line 907 indicates the end of sampling of a number of events via the counters (118, 119). However, the method of FIG. 9 may be performed for any number of iterations to obtain user-desired performance data associated with the performance of the units (117, 201 through 210) within the computing device (116) to be analyzed. Details regarding interpolation (block 904) are described above in connection with FIGS. 3 and 7 and the associated description.

The results of the sampling and interpolation may be output (block 905) to a user. In one example, the results are output to the display device (109) of the computing system (100) in the form of graphs or other user-readable formats.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the computing system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of collecting hardware performance data. The method includes, with a processor, executing an event parameter determination module to determine a number of event entanglement parameters and a number of minimum sampling rate parameters. The method further includes, with the processor, executing an assignment module to assign a plurality of interleaving groups of programmable counters from a number of programmable counters within a computing device. The method further includes, with the processor, executing an interpolation module to interpolate missed samples between a number of captured values of a first event. This method may have a number of advantages, including: (1) allowing users to sample many more hardware performance counter events to trace or profile an application in a single run; (2) providing collection of 3 to 4 times more events than otherwise possible; (3) making it possible with a limited number of hardware counters a processing device manufacturer may provide, to capture and study more than the minimum number of critical events in the processor captures; (4) allowing capture of all the events of interest to a user; (5) not having to deal with yielded misaligned or mismatched sample results between multiple runs; and (6) reducing the time required to capture hardware performance counter events that may be impractically time consuming, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of collecting hardware performance data comprising:

in a system comprising a number of fixed counters to sample a particular event without variation and a number of programmable counters which are reassignable to sample different events, with a processor:
executing an event parameter determination module to determine:
a number of event entanglement parameters from which the processor is to identify:
events without separation to be sampled in a sampling period; or
events to be distributed over separate sampling periods; and
a number of minimum sampling rate parameters;
executing an assignment module to assign a plurality of interleaving groups of programmable counters from a number of programmable counters within a computing device based on a user-defined priority list of parameters;
executing an event sampling module to sample a first number of events occurring in the computing device based on an assignment of the plurality of interleaving groups of programmable counters, the interleaving groups to identify which of a number of events the programmable counters are to sample in a corresponding number of sampling periods;
executing an interpolation module to interpolate missed samples between a number of captured values of a first event; and
executing a reassignment module to reassign the number of programmable counters to sample different events.

2. The method of claim 1, wherein the interpolation is performed in a real-time manner between the execution of each of the assigned interleaving groups of programmable counters.

3. The method of claim 1, wherein the interpolation is performed after a run of all of the assigned interleaving groups of programmable counters.

4. The method of claim 1, wherein assigning a plurality of interleaving groups of programmable counters comprises:
receiving data defining a number of events associated with a number of analyzable units from a user; and
assigning the plurality of interleaving groups of programmable counters to a number of events based on the received data.

5. The method of claim 1, wherein a number of fixed counters are assigned to execute with the plurality of interleaving groups of programmable counters.

6. The method of claim 1, wherein the event entanglement parameters and the minimum sampling rate parameters are subjected to a number of priority conditions,
wherein the priority conditions comprise:
not assigning a number of events to the plurality of interleaving groups of programmable counters that are assigned to a fixed counter;
assigning a number of entangled events with a most stringent minimum sampling requirement in decreasing order of stringentness;
assigning a first number of non-entangled events with a most stringent minimum sampling requirement in decreasing order of stringentness; and
assigning a second number of non-entangled events that do not comprise a minimum sampling requirement.

7. The method of claim 6, wherein the parameters are user-definable.

8. The method of claim 1, wherein the interleaving groups of programmable counters define which of the events the programmable counters within each of the groups of programmable counters are to sample in a corresponding number of sampling periods and a sequence at which the interleaving groups of programmable counters are to sample the events.

9. The method of claim 1, wherein the first event is selected from the group consisting of cache misses, cache loads, and cache stalls.

10. The method of claim 1, wherein assigning the plurality of interleaving groups of programmable counters comprises assigning entangled events based on the minimum sampling requirements associated with the events.

11. The method of claim 1, wherein the interpolation module is to weight an interpolation of missed samples.

12. The method of claim 1, wherein the interpolation module is to indicate an interpolated value.

13. A computing system for collecting hardware performance data, comprising:
  a number of hardware devices, each hardware device comprising a number of fixed counters and a number of programmable counters;
  the number of fixed counters which are to sample a particular event without variation;
  the number of programmable counters which are reassignable to sample different events; and
  a processor to execute:
    an event parameter determination module to determine:
      a number of event entanglement parameters from which the processor is to identify:
        a number of events without separation to be sampled in a sampling period; or
        events to be distributed over separate sampling periods; and
      a number of minimum sampling rate parameters;
    an assignment module to assign a plurality of interleaving groups of programmable counters from the number of programmable counters within a computing device based on a user-defined priority list of parameters;
    an event sampling module to sample a first number of events occurring in the computing device based on an assignment of the plurality of interleaving groups of programmable counters, the interleaving groups to identify which of a number of events the programmable counters are to sample in a corresponding number of sampling periods;
    an interpolation module to interpolate missed samples between a number of captured values of a first event; and
    a reassignment module to reassign the number of programmable counters to sample different events.

14. The computing system of claim 13, wherein the parameters comprise:
  not assigning a number of events to the plurality of interleaving groups of programmable counters that are assigned to a fixed counter;
  assigning a number of entangled events with a most stringent minimum sampling requirement in decreasing order of stringentness;
  assigning a first number of non-entangled events with a most stringent minimum sampling requirement in decreasing order of stringentness; and
  assigning a second number of non-entangled events that do not comprise a minimum sampling requirement.

15. The computing system of claim 13, wherein the computing device is a computing node coupled to the computing system via a network, and the computing system is detecting performance data of the computing node.

16. The computing system of claim 13, wherein the assignment module precludes assigning an event to a programmable counter that is preassigned to a fixed counter.

17. A computer program product for collecting hardware performance data, the computer program product comprising:
  a non-transitory computer readable storage medium comprising computer usable program code embodied therewith, the computer usable program code to, when executed by a processor on a hardware device comprising a number of fixed counters to sample a particular event without variation and a number of programmable counters which are reassignable to different events:
    identify, from a number of event entanglement parameters:
      a number of events without separation to be sampled within a sampling period; or
      events to be distributed over separate sampling periods;
    determine, from minimum sampling rate parameters, a minimum sampling period rate per event;
    assign a plurality of interleaving groups of programmable counters based on the number of event entanglement parameters and the number of minimum sampling rate parameters;
    sample a first number of events occurring in a computing device based on an assignment of the plurality of interleaving groups of programmable counters, the interleaving groups used to identify which of a number of events the programmable counters within each of the groups of programmable counters are to sample in a corresponding number of sampling periods;
    interpolate between two sampled values of a first event if the two sampled values were captured during two non-consecutive sampling periods; and
    reassign the number of programmable counters to sample different events.

18. The computer program product of claim 17, further comprising computer usable program code to, when executed by the processor:
  instruct the assigned interleaving groups of programmable counters to sample events occurring in the computing device based on the assignment; and
  between samplings performed for the of interleaving groups of programmable counters, reconfigure a number of the programmable counters to execute a sampling of a subsequent number of events based on an assignment defined by a subsequent interleaving group of the programmable counters.

19. The computer program product of claim 17, wherein the interleaving groups define which of a number of events the programmable counters within each of the groups of programmable counters are to sample in a corresponding number of sampling periods and a sequence at which the interleaving groups of programmable counters are to sample the events.

* * * * *